United States Patent
Kamath Koteshwara et al.

(10) Patent No.: US 11,564,036 B1
(45) Date of Patent: Jan. 24, 2023

(54) PRESENCE DETECTION USING ULTRASONIC SIGNALS WITH CONCURRENT AUDIO PLAYBACK

(71) Applicant: Amazon Technologies, Inc., Seattle, WA (US)

(72) Inventors: Krishna Kamath Koteshwara, Santa Clara, CA (US); Zhen Sun, Boston, MA (US); Spencer Russell, Jamaica Plain, MA (US); Tarun Pruthi, Fremont, CA (US); Yuzhou Liu, Mountain View, CA (US); Wan-Chieh Pai, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 17/076,584

(22) Filed: Oct. 21, 2020

(51) Int. Cl.
| | |
|---|---|
| *H04R 3/04* | (2006.01) |
| *H04R 5/04* | (2006.01) |
| *G10L 21/0232* | (2013.01) |
| *G01S 15/04* | (2006.01) |
| *H04R 5/027* | (2006.01) |
| *G10L 21/0208* | (2013.01) |

(52) U.S. Cl.
CPC ............... *H04R 3/04* (2013.01); *G01S 15/04* (2013.01); *G10L 21/0232* (2013.01); *H04R 5/027* (2013.01); *H04R 5/04* (2013.01); *G10L 2021/02082* (2013.01)

(58) Field of Classification Search
CPC .. H04R 3/04; H04R 5/027; H04R 5/04; G01S 15/04; G10L 21/0232; G10L 2021/02082
See application file for complete search history.

(56) References Cited

U.S. PATENT DOCUMENTS

| | | |
|---|---|---|
| 5,142,649 A | 8/1992 | O'Donnell |
| 9,978,387 B1 * | 5/2018 | Pogue ................. G10L 21/0208 |
| 10,267,912 B1 | 4/2019 | Birkenes et al. |

(Continued)

OTHER PUBLICATIONS

Office Action for U.S. Appl. No. 16/116,364, dated Feb. 28, 2020, Koteshwara, "Presence Detection Using Ultrasonic Signals", 11 Pages.

(Continued)

*Primary Examiner* — Daniel R Sellers
(74) *Attorney, Agent, or Firm* — Lee & Hayes, P.C.

(57) ABSTRACT

Techniques for presence-detection devices to detect movement of a person in an environment by emitting ultrasonic signals using a loudspeaker that is concurrently outputting audible sound. To detect movement by the person, the devices characterize the change in the frequency, or the Doppler shift, of the reflections of the ultrasonic signals off the person caused by the movement of the person. However, when a loudspeaker plays audible sound while emitting the ultrasonic signal, audio signals generated by microphones of the devices include distortions caused by the loudspeaker. These distortions can be interpreted by the presence-detection devices as indicating movement of a person when there is no movement, or as indicating lack of movement when a user is moving. The techniques include processing audio signals to remove distortions to more accurately identify changes in the frequency of the reflections of the ultrasonic signals caused by the movement of the person.

20 Claims, 12 Drawing Sheets

(56) References Cited

U.S. PATENT DOCUMENTS

| | | | |
|---|---|---|---|
| 10,795,018 B1* | 10/2020 | Koteshwara | H04R 1/406 |
| 2005/0096540 A1 | 5/2005 | Ooshima | |
| 2008/0048907 A1 | 2/2008 | Matsuura et al. | |
| 2008/0232608 A1 | 9/2008 | Ullmann | |
| 2012/0001875 A1 | 1/2012 | Li et al. | |
| 2013/0129102 A1* | 5/2013 | Li | H04M 9/082 |
| | | | 381/71.1 |
| 2013/0230180 A1* | 9/2013 | Thormundsson | H04R 29/00 |
| | | | 381/56 |
| 2016/0154089 A1 | 6/2016 | Altman | |
| 2018/0160235 A1* | 6/2018 | Lesso | H04R 23/00 |
| 2018/0233145 A1 | 8/2018 | Bathiche et al. | |
| 2018/0259613 A1 | 9/2018 | Hirata et al. | |
| 2019/0045312 A1 | 2/2019 | Gunawan et al. | |
| 2019/0050061 A1 | 2/2019 | Borstad et al. | |
| 2019/0187261 A1 | 6/2019 | Peso Parada et al. | |
| 2019/0297407 A1* | 9/2019 | Stanford-Jason | G10L 25/84 |

OTHER PUBLICATIONS

Office Action for U.S. Appl. No. 16/116,364, Koteshwara, "Presence Detection Using Ultrasonic Signals" 11 Pages.

Office Action for U.S. Appl. No. 16/116,364, dated Jul. 10, 2019, Koteshwara, "Presence Detection Using Ultrasonic Signals", 15 pages.

Office Action for U.S. Appl. No. 17/015,795, dated Jan. 20, 2022, Koteshwara, "Processing Audio Signals for Presence Detection", 23 pages.

* cited by examiner

PRESENCE DETECTION USING ULTRASONIC SIGNALS WITH CONCURRENT AUDIO PLAYBACK

BACKGROUND

Many devices and technologies exist for detecting the presence of users in different environments, and for different purposes. For instance, motion-sensing lights are used to automate lighting control based on detecting motion, motion-sensing security devices can trigger alarms upon detecting motion, etc. These presence-sensing devices can utilize many different technologies to detect the presence and/or motion of a user in an environment, such as acoustic sensing, passive infrared sensing (PIR) sensing, Wi-Fi Channel Sate Information (CSI) sensing, radio-wave sensing, etc. To perform many of these types of presence sensing techniques, the presence-sensing devices are often equipped with specialized hardware, such as specialized sensors, specialized processors, etc. However, the different types of specialized hardware required by presence-sensing devices to detect presence or motion can be disadvantageous for many reasons, such as the high cost to include in devices, consumption of large amounts of power, emitting large amounts of heat, etc. Additionally, beyond being able to detect motion, existing presence-sensing devices are unable to provide further contextual information about the motion in the environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
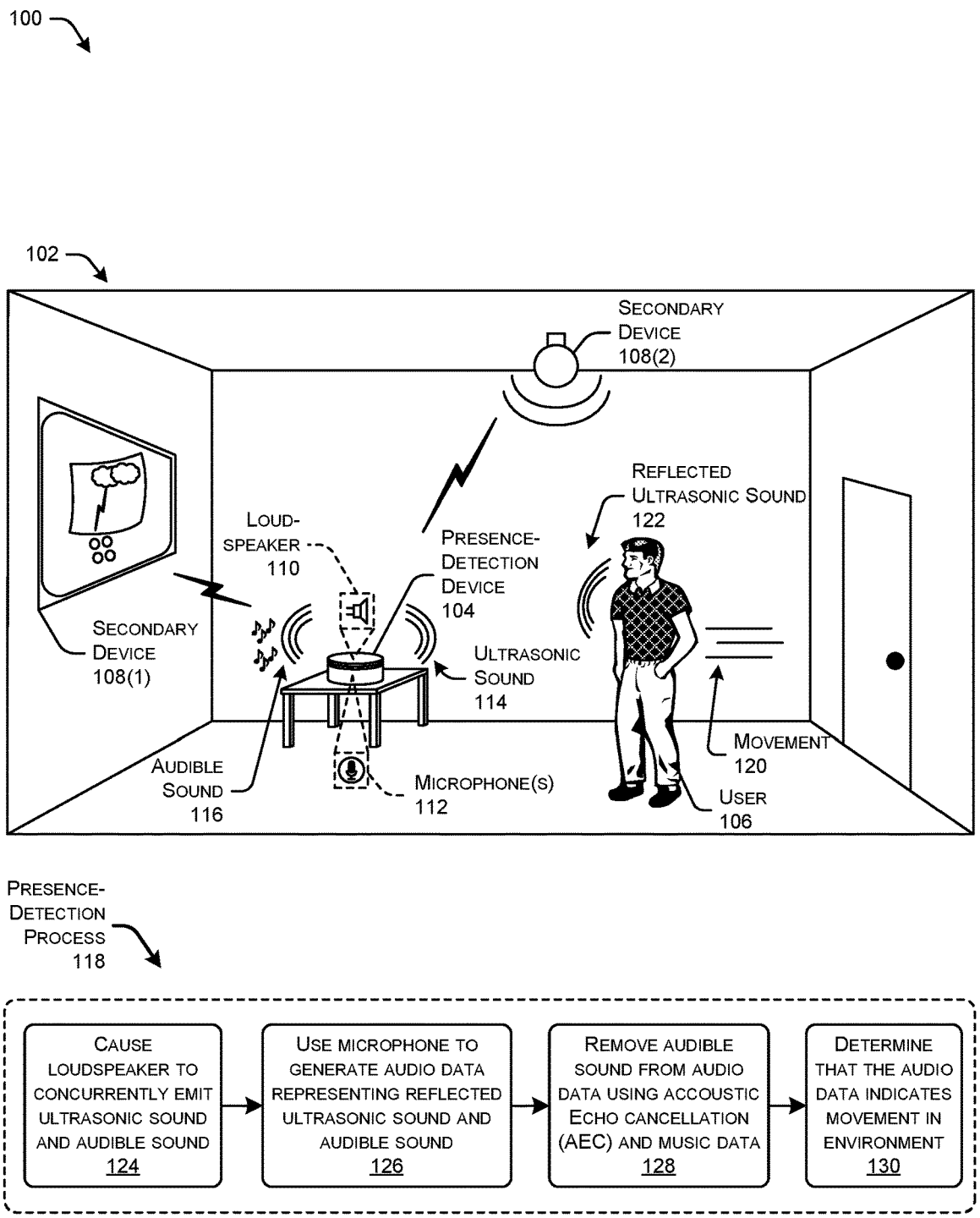
FIG. 1 shows an illustrative presence-detection device interactive architecture set in a home environment. The architecture includes at least one presence-detection device controlling secondary devices physically situated in the home based on detecting presence of a user. In this example, the presence-detection device includes a light switch that has a loudspeaker and a microphone to detect presence, and/or lack of presence, of a user.

This disclosure describes, in part, presence-detection devices that are able to detect movement of a person in an environment by emitting ultrasonic signals into the environment using a loudspeaker that is concurrently outputting audible sound into the environment. To detect movement by the person, the presence-detection devices characterize the change in the frequency, or the Doppler shift, of the reflections of the ultrasonic signals off the person caused by the movement of the person relative to the presence-detection devices. However, when a loudspeaker plays audible sound (e.g., music, machine speech, etc.) while emitting the ultrasonic signal, audio signals generated by microphones of the presence-detection devices include distortions in the frequency range of the reflected signals caused by the loudspeaker concurrently outputting the audible sound. These distortions can be interpreted by the presence-detection devices as indicating motion of a user when there is actually no movement of a user in the environment (e.g., false acceptance, false identification, etc.), and/or interpreted as indicating lack of motion of a user when a user is actually moving in the environment (e.g., false rejection, incorrect rejection, etc.). This disclosure describes techniques for processing audio signals to remove distortions in a frequency range of the reflections of ultrasonic signals to more accurately identify changes in the frequency of the reflections of the ultrasonic signals off the person caused by the movement of the person relative to the presence-detection devices.

Rather than designing or redesigning devices to include expensive, resource-intensive, specialized sensors for detecting motion, such as dedicated ultrasonic transducer, the presence-detection devices described herein may utilize an on-board loudspeaker to emit the ultrasonic signals. However, existing, on-board speakers are often configured to output sound within frequency ranges that are audible to humans (e.g., 35 Hz-20 kHz). To utilize these traditional loudspeakers to transmit ultrasonic signals, the techniques described herein include audio data processing techniques to improve the performance of presence-detection algorithms to accommodate for the loudspeaker transmitting the out-of-band frequencies of the ultrasonic signals (e.g., frequencies above 20 kHz).

Further, the many presence-detection devices may have multiple purposes or uses beyond detecting presence. Some presence-detection devices may interact with users via speech and/or other input, and often output audible sound (or "audible noise," "audible audio," etc.) for the users. For instance, the presence-detection devices may stream music for users, output machine speech to interact with users, and/or output other audible sound for users. However, for devices that include a single loudspeaker, the concurrent output of audible sound and ultrasonic signals by the single loudspeaker may cause distortions audio signals generated by microphones of the devices in the frequency range of reflections of the ultrasonic signals (or "reflection signals"). As noted above, these distortions may reduce the accuracy of presence-detection techniques because the distortions can result in false acceptances of movement, and/or false rejections or movement, by the presence-detection devices.

In some examples, the presence-detection device may be installed or placed in an environment to monitor a location, such as a room of a house. For instance, the presence-detection device may be a light switch that is installed in a room, a voice-interface device moved into a room to interact with a user through voice, a security-system device to monitor a location, etc. Upon being placed in the room or other environment, and/or periodically, the presence-detection device may undergo a calibration process to determine a more optimized frequency at which to emit the ultrasonic signals in the room. For example, the presence-detection device may use the loudspeaker to emit an ultrasonic calibration signal (e.g., an ultrasonic sweep signal/tone), generate audio data using the microphone array that represents the ultrasonic calibration signal, and analyze that audio data to determine a more optimal frequency range to use for subsequent ultrasonic signal transmissions. For example, the presence-detection device may analyze various frequency bands of a sweep representing the ultrasonic calibration signal, and select the frequency band or range that has the most desirable signal-to-noise (SNR) ratio to emit the ultrasonic calibration signal.

The presence-detection devices may periodically, or continuously, emit ultrasonic signals into the room to determine if a user is present in the room, or depending on the use-case, whether the room is vacant. The presence-detection devices may use the loudspeaker to pulse an ultrasonic signal at the determined frequency, and analyze audio data generate by the microphone array to detect one or more of (i) motion of a person, (ii) a direction of the motion of the person, or (iii) a number of people in the room. In some examples, the algorithms utilized by the presence-detection devices when analyzing the audio data to detect movement are based upon the Doppler Effect. Generally, the Doppler effect (or the Doppler shift) is the change (increase or decrease) in frequency or wavelength of a wave in relation to an object that is moving relative to the wave source. As an illustration, the Doppler effect is responsible for how a siren on an ambulance sounds louder and shriller as it approaches a person, and changes its pitch as soon as the ambulance passes the person.

To detect presence, the presence-detection devices uses a microphone to generate audio data that represents at least the ultrasonic signal that is emitted into the environment by the loudspeaker. The presence-detection devices may capture audio data for a sufficiently long enough period of time to help ensure that the movement by a person may be detected using the reflection of the ultrasonic signal off the person as they move. Once the audio data is generated, the presence-detection devices may apply high-pass and/or low-pass filters to remove unwanted frequencies, and down-sample the audio data to a lower sampling or frequency for baseband processing as the audio data that represents the movement of the user is at a lower frequency range than the transmission frequency range.

In order to analyze the audio data to determine whether the reflection of the ultrasonic signal represented in the audio data indicates movement of a person due to a change in frequency according to the Doppler effect, the presence-detection devices may divide the signal represented in the audio data into its frequency components, or its magnitude and phase components. For instance, the presence-detection devices may utilize one or more algorithms, such as Fast Fourier transform (FFT), to transform the signal represented in the audio data in the time domain into the frequency domain, and represent the frequency of the reflected ultrasonic signal by the magnitude and phase components.

Once the reflected signal is represented by its magnitude and phase components, the presence-detection devices may further utilize a log-transform to transform the magnitude components of the frequency of the reflected signal. For instance, due to the high-dynamic range of the magnitude components of the frequency of the reflected signal, and because the amount of reflection that occurs from movement of the user is relatively small (may appear similar to noise), the log-transform may transform the magnitude components using a log-transforming into a larger range. After applying a log-transform to the magnitude components, the change in magnitude caused by the reflection of the ultrasonic signal off of the moving object, or person, will be more easily identifiable.

In some examples, to determine whether the frequency response of the reflection of the ultrasonic signal indicates a reflection off of a moving object due to the Doppler effect, one or more machine-learning models may be trained and utilized as classifiers to indicate whether movement has been detected in the environment. For instance, a machine-learning model, such as a neural network, may be trained with training data, such as training data that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the machine-learning models may be trained to identify input vectors as representing reflections of ultrasonic signals that reflected off a moving object, or that did not reflect off a moving object.

However, as noted above, there may be distortion in scenarios where the presence-detection device is using a single loudspeaker to concurrently output the ultrasonic signal with audible sound (e.g., music sound, machine-speech sound, etc.). In some examples, the loudspeaker may be responsible for the interference due to intermodulation distortion due to speaker nonlinearity, and the distortion may also be due to the motion of the cone. When microphone(s) of the presence-detection devices generate audio signals representing the reflection signals, there may be distortions in the frequency range of the reflection signals caused by the concurrent output of the audible output data. In some instances, the intermodulation distortions may be manifested as amplitude modulations in the signals. However, the distortions that are in the ultrasonic frequency range of the reflection signals may generally correspond to, or be correlated with, the audio signal that represents the audible sound.

Accordingly, to remove the distortions in the audio signal in the frequency range of the reflection signals, the techniques described herein include using acoustic echo cancellation (AEC) techniques with a reference signal that generally corresponds to the audible sound being output by the loudspeaker. Using a reference signal that corresponds to the audible sound, the distortions in the reflection signals (which are correlated with the audible sound) may be removed using AEC techniques. This disclosure includes various processing techniques for removing distortions in audio signals representing ultrasonic reflection signals caused by concurrent output of audible sound.

The presence-detection devices may use one or more microphones to generate audio data that represents reflection signals that have distortions caused by concurrent output of audible sound by the loudspeaker, where the distortions are represented by a signal that is correlated with the audible sound. In one example, the presence-detection device may use AEC techniques to remove the distortions where the reference signal is generated using audio data stored in a buffer of the device that is used by the loudspeaker to output the audible sound. For instance, the presence-detection device may use the audio data to generate a reference signal that corresponds to the audible sound, and that reference signal may be used to remove the distortions from the audio signal using the AEC techniques. Using the AEC techniques, the presence-detection device may use the reference signal to remove the distortions in the reflected signal represented in the audio signal to help isolate the reflected signal.

In some examples, the reference signal may be generated using another microphone of the presence-detection device. The presence-detection device may include multiple microphones, some of which are located in closer proximity to the loudspeaker than others. In some examples, a microphone located in closest proximity, or in close proximity, to the loudspeaker may be used to generate audio signals that represent the audible sound with more strength as compared to the reflection signals. Accordingly, a microphone located further away from the loudspeaker may be used to generate the audio signal that represents the reflected signal and the audible sound, and a microphone in closer proximity to the loudspeaker may be used to generate the reference signal. The reference signal may represent the audible noise with more strength (e.g., higher decibels (dB)) as compared to the audio signal generated by the microphone located further from the loudspeaker. The audio signal may be processed using AEC techniques and the reference signal to remove (or attenuate) the portion of the audio signal representing the audible sound (e.g., the distortions) to help isolate the reflection signals for further analysis to detect movement.

In another example, the presence-detection device may not only emit the ultrasound signal and the audible noise, but may further concurrently emit another ultrasound signal into the environment. That is, the presence-detection device may be configured to emit a first ultrasound signal and a second ultrasound signal into the environment while outputting the audible sound. The first ultrasound signal and the second ultrasound signal may be emitted in different frequency ranges that are spaced apart (e.g., 32 kHz and 44 kHz). A microphone of the device may generate an audio signal that represents first reflection signals and second reflection signals that represent reflections of the first ultrasound signal and the second ultrasound signal. Generally, the distortion caused by the concurrent output of the audible sound may be experienced in both of the first reflection signal and the second reflection signal such that the distortions are symmetric, or mirror each other, across the different reflection signals. However, the amount of Doppler effect is directly proportional to the frequency of emission, and when the two ultrasonic signals are emitted at different frequencies that are sufficiently spaced apart, the Doppler spread will be represented differently in the first reflection signal and the second reflection signal. Accordingly, the device may process the audio signal and extract first feature data representing the frequency range of the first reflection signal, extract second feature data representing the frequency range of the second reflection signal, and input the first and second feature data into an AEC component. The AEC component may be configured to identify, and remove, portions of the first feature data and the second feature data that are correlated, symmetric, or otherwise correspond to each other, which may be the portions representing the audible noise. Accordingly, the output of the AEC component may be the portions that are not correlated, which may be the portions of the first and second feature data that represent the reflection signals. In this way, the AEC component may isolate the feature data representing the reflection signals, and thus the Doppler effect, for further use in detecting movement of a user in the environment.

In some examples, the techniques described herein may include various optimizations. For instance, when the presence-detection devices are playing music audio data, or otherwise outputting audible audio data (e.g., sound in a human-audible frequency range such as 15 Hz to 20 kHz), the presence-detection devices may be configured to determine how to mix the music audio data with the ultrasonic audio data in such a way that saturation or clipping is avoided. For instance, the presence-detection devices may determine power levels at which the music audio data is to be output, and determine power levels at which to emit the ultrasonic signals to avoid clipping by the loudspeaker. That is, the power level at which ultrasonic signals are output may be adjusted based on the power levels at which the audible sound is output to avoid audio clipping by the loudspeaker when outputting the audible sound.

While the techniques described herein may be applied and useful in many scenarios, the presence-detection devices may perform various operations upon detecting movement of a person, detecting a direction of the movement of the person, and/or detecting the number of people in the room. For instance, the presence-detection devices may cause various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative architecture 100 including a home environment 102 in which a presence-detection device 104 is located in the home environment 102 to detect presence of a user 106. The architecture 100 includes at least one presence-detection device 104 controlling secondary devices 108 (e.g., television 108(1), light 108(2), or any other controllable device) physically situated in the home 102 based on detecting presence of the user 106. In this example, the presence-detection device 104 includes or comprises a light switch that has a loudspeaker 110 and one or more microphones 112 to detect presence, and/or lack of presence, of the user 106.

As shown in FIG. 1, the loudspeaker 110 of the presence-detection device 104 may transmit, or otherwise output, an emitted sound 114. Generally, the loudspeaker may comprise any type of electroacoustic transducer that convers an electric audio signal into a corresponding sound. Generally, the loudspeaker 110 may be an existing on-board speaker configured to output sound within frequency ranges that are audible to humans, such as 35 Hz-20 kHz. However, in the illustrated example the emitted sound 114 may include at least a pulsed, or a continuous, emission of sound 114 at a frequency that is outside the frequency range in which humans can hear sound (e.g., in the range of 20 kHz to 96 kHz). Thus, the loudspeaker 110 may be emitting sound 114, such as ultrasonic signals, that are traditionally out-of-band for the loudspeaker 110. Further, the loudspeaker 110 may be concurrently outputting audible sound 116, such as music data. Generally, the audible sound 116 may be output at least partly while (e.g., concurrently, simultaneously, etc.) while the ultrasonic sound 114 is being emitted by the loudspeaker 114.

As illustrated, FIG. 1 may represent a high-level the presence-detection process 118 performed by the presence-detection device 104 in order to detect movement of an object, such as the user 106. At 124, the presence-detection device 104 may cause the loudspeaker 110 to emit the ultrasonic sound (e.g., emitted sound 114) as well as the audible sound 116 into the home 102. In some examples, the presence-detection device 104 may continuously cause the loudspeaker 110 to emit the ultrasonic sound 114, while in other examples, the ultrasonic sound 114 may be emitted periodically, or pulsed.

Upon being emitted, the sound 114 will generally reflect off of objects in the home 102. As briefly mentioned above, when the emitted sound 114 bounces off objects, various changes to the characteristics of the audio signal may occur. For instance, as mentioned above, the Doppler effect (or Doppler shift) is one such change in audio signal characteristics where the frequency or wavelength of a wave, such as an emitted sound wave 114, changes in relation to an emitting object upon bouncing off of a moving object. In the illustrated example, the emitted sound 114 may experience a change in frequency upon reflecting off the user 106 if the user 106 is moving. Thus, because there is movement 120 by the user 106, the reflected ultrasonic sound 122 (or reflected signal) may experience a change in frequency. Generally, if the movement 120 of the user 106 is towards the loudspeaker, then the reflected ultrasonic sound 122 may have a higher frequency compared to the emitted sound 114 when detected at the presence-detection device 104. Conversely, the reflected ultrasonic sound 122 may have a lower frequency relative to the presence-detection device 104 compared to the emitted sound 114 when the movement 120 of the user 106 is away from the presence-detection device 104.

At 126, the presence-detection device 104 may use a microphone array 112 (and/or a single microphone) to generate audio data representing the reflected ultrasonic sound 122 and the audible sound 116. In some examples, the microphone(s) 112 may include two or more microphones arranged on, or in, the presence-detection device 104 in any pattern (e.g., rows of microphones, circular pattern on a surface, offset and/or alternating rows of microphones, etc.). Further, the microphone(s) 112 may be facing, or oriented, in different directions to capture sound from different directions with a better signal-to-noise ratio. Additionally, or alternatively, the presence-detection device 104 may performing acoustic processing on audio data/signals generated by the microphones of the microphone(s) 112 in order to perform beamforming to perform directional signal/sound reception in the home environment 102. In this way, the microphone(s) 112 may be configured to detect sound from different regions of the home 102 with stronger SNR values. Generally, the microphone(s) 112 may comprise transducers that convert sound (e.g., reflected ultrasonic sound 122) into electrical signals, or audio data.

At 128, the presence-detection device 104 may include one or more components which extract feature data from the audio data, and remove audible sound from the audio data using AEC techniques. In some examples, at least one of the microphone(s) 112 may create an audio channel. The audio channel (e.g., audio signal) may represent the reflected ultrasonic sound 122 as well as the audible sound 116. The components may perform various processing on the audio signal (e.g., filtering, demodulating, down sampling, etc.) in order to get the audio into a format to be input into an AEC component. The audio signal may then be processed using AEC techniques and a reference signal in order to remove the distortion caused by concurrent output of the audible sound 116 by the loudspeaker 110. The output after processing the audio signal using AEC techniques may be an audio signal that represents the reflected ultrasonic signal 122 where the distortion caused by the audible sound 116 has been attenuated and/or removed. Further, the presence-detection device 104 may perform additional processing, such as Fourier transform(s), log-transform(s), etc., prior to extracting feature data. In some examples, the components of the presence-detection device 104 may extract magnitude feature data and phase feature data that represent the frequency of the reflected ultrasonic sound 122 as detected by the microphone(s) 112 for periods of time to determine if movement 120 of the user 106 exists in the home 102.

Generally, a Fourier transform of a physical, time signal (e.g., the reflected sound 122) is a decomposition of the time signal into a linear combination of frequency components with different magnitudes and phase shifts or a spectrum of frequencies over a continuous range. Thus, using a Fourier transform, a time signal may be broken down into frequency components. As an example, the original time signal may be broken down such that each individual sinusoidal wave of each frequency present in the Fourier transform has a respective amplitude and phase shift. Stated simply, the magnitude data of the Fourier transform of a time signal is the amplitude of the associated frequency component, and the phase data for the Fourier transform of the time signal is the phase shift from that of the time signal (and the amplitude data represents the total contribution). The Fourier transform may comprise one or more of a Continuous Time Fourier Transform (CTFT), a Continuous Time Fourier Series (CTFS), a Discrete Time Fourier Transform (DTFT), a Discrete Time Fourier Series (DTFS), etc.), a logarithmic transform algorithm (e.g., base-2 logarithm, base-10 logarithm, and/or any other transform.

At 130, the presence-detection device 104 may classify the feature data as indicating movement in the environment 102. For instance, the presence-detection device 104 may include one or more machine-learning models that have been trained to determine whether feature data, such as magnitude feature data and/or phase feature data, indicate that reflected ultrasonic sounds 122 have bounced off of a moving object, such as the user 106. Additionally, as described in more detail below, the components of the presence-detection device 104 may further be configured to determine a direction of the movement 120 of the user 106 based on the phase feature data, and also determine whether multiple users 106 are in the environment 102.

Figure 2:
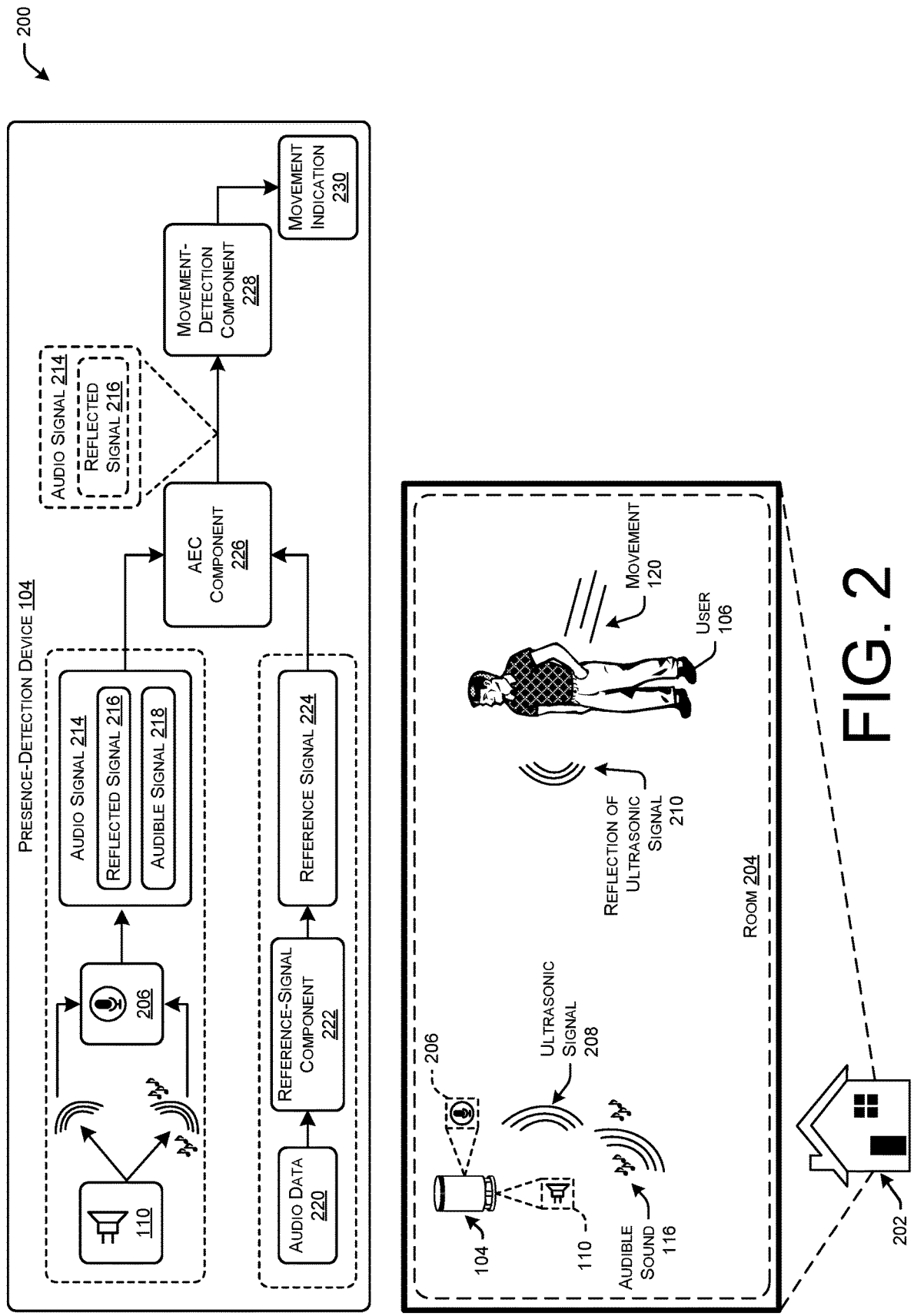
FIG. 2 illustrates an example environment in which a presence-detection device uses a loudspeaker to output an ultrasonic signal to detect the presence of a user moving through an environment.

FIG. 2 illustrates an example environment in which a presence-detection device uses a loudspeaker to output an ultrasonic signal to detect the presence of a user moving through an environment.

As illustrated, the example environment 200 may include a monitored location, such as a home 202, that includes a room 204. The room may include a user 106 and a presence-detection device 104. The presence-detection device 104 may include a loudspeaker 110 and at least one microphone 206. The loudspeaker 110 may transmit/emit an ultrasonic signal 208 into the room 204 periodically, or continuously. Additionally, the loudspeaker 110 may output audible sound 116 into the room 204 concurrently with the ultrasonic signal 208. The ultrasonic signal 208 may bounce off objects in the room 204, such as the user 106. In such examples, the ultrasonic signal 208 may bounce of the user 106 resulting in one or more reflections of the ultrasonic signal 208. In such examples, the microphone 206 may generate an audio signal 216 including a reflected signal 216 portion and an audible signal 218 portion corresponding to the audible sound 116.

Further, a reference-signal component 222 may utilize audio data 220 to generate a reference signal 224. The audio data 220 may be the audio data 220 used to output the audible sound 116 by the loudspeaker 110. The reference-signal component 224 may generate the reference signal 224 using a same sample rate as that of the audio signal 214, in a same frequency range, etc.

The audio signal 214 and the reference signal 224 may each be input into an AEC component 226. The AEC component 226 may perform various techniques to identify correlations between the audio signal 214 and the reference signal 224, and remove or filter the correlated portions from the audio signal 214. Thus, an output of the AEC component 226 may be the audio signal 214 that represents the reflected signal 216, but the audible signal 218 representation may be removed and/or attenuated. That is, the AEC component 226 may identify and remove distortions in the reflected signal 216 caused by concurrent output of the audible sound 116. In some instances, the distortions caused by the audible sound 116 may manifest themselves in the frequency range of the reflected signal 216 and mirror the audible sound 116. Thus, the audible signal 218 may mirror distortions caused by the audible sound 116 in the reflected signal 216.

In some examples, a movement-detection component 228 may extract feature data representing the frequency of the reflections of the ultrasonic signals 208 (e.g., magnitude feature data, phase feature data, etc.) from the audio signal 214. The movement-detection component 228 may determine, based on the magnitude feature data of the audio signal 214 representing the reflection of the ultrasonic signal 208, that the user 106 was in motion. As described in more detail below, a classifier of the presence-detection device 104 may determine, based on the magnitude feature data, that the user 106 was moving, or detect movement 120 of the user 106, in the room 204. Further, the classifier of the presence-detection device 104 may determine, based on a comparison (e.g., difference) between phase feature data of the two audio streams, a direction of movement of the user 106 through the room 204. Thus, based on the phase feature data from the multiple audio streams, the presence-detection device 104 may determine the direction of movement that the user 106 is moving through the environment 204.

Figure 3:
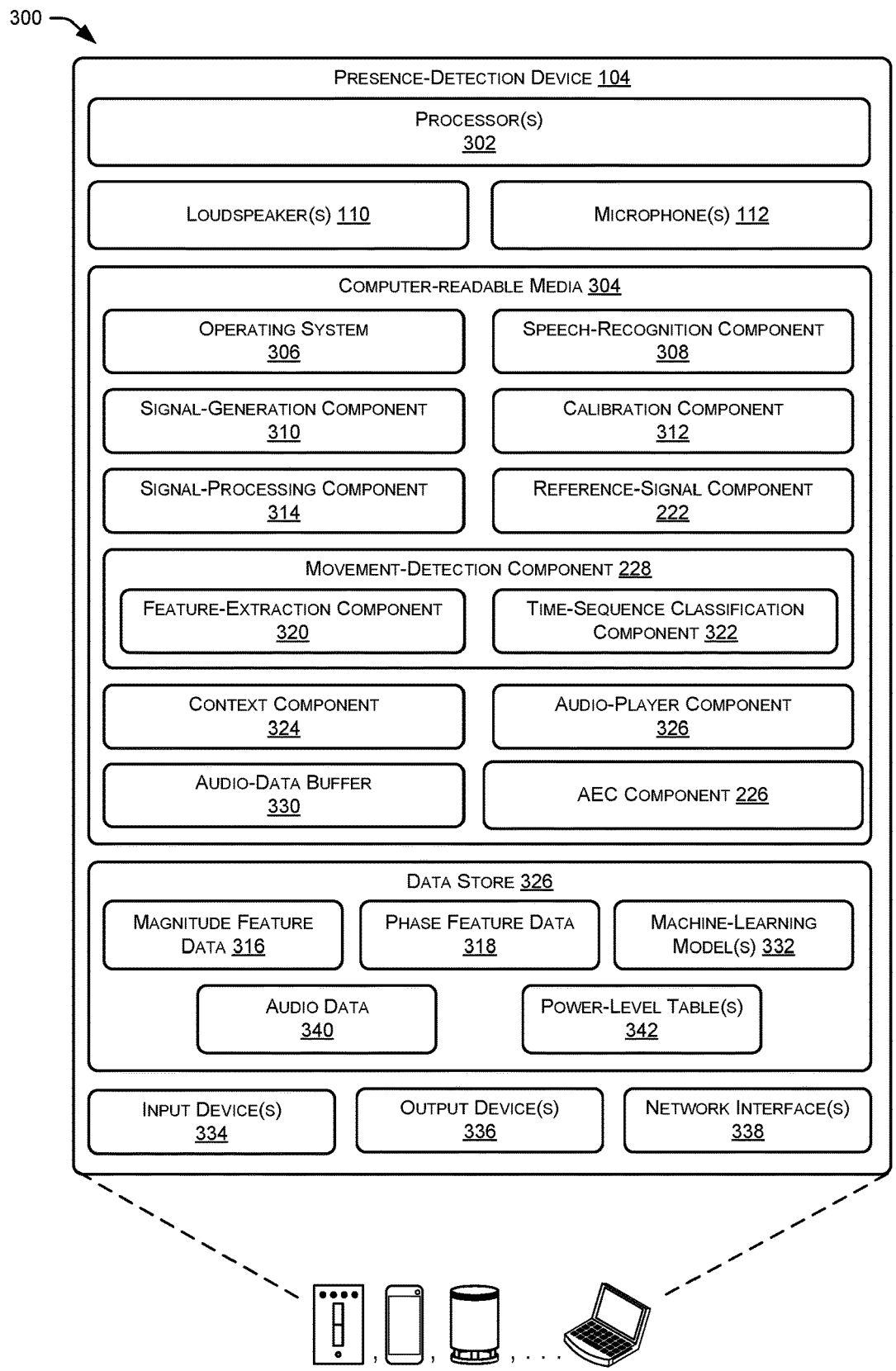
FIG. 3 illustrates an example configuration of components of a presence-detection device.

FIG. 3 illustrates an example configuration of components of a presence-detection device 104. Generally, the presence-detection device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

The presence-detection device 104 may include one or more processors 302 configured to execute various computer-executable instructions stored on the presence-detection device 104. Further, the presence-detection device 104 may include one or more loudspeakers 110 positioned at one or more locations on the presence-detection device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the presence-detection device 104.

The presence-detection device 104 may further include the microphone(s) 112 that comprises one or more microphones which may include transducers that convert sound into an electrical audio signal. The microphone(s) 112 may include any number of microphones that are arranged in any pattern. For example, the microphone(s) 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphone(s) 112 may be in a planar configuration, or positioned apart in a non-planar three-dimensional region. In some implementations, the microphone(s) 112 may include a spatially disparate array of sensors in data communication. For example, a networked array of sensors may be included. The microphone(s) 112 may include omni-directional microphones, directional microphones (e.g., shotgun microphones), and so on.

The presence-detection device 104 may further include computer-readable media 304 that may be used to store any number of software and/or hardware components that are executable by the processor(s) 300. Software components stored in the computer-readable media 304 may include an operating system 306 that is configured to manage hardware and services within and coupled to the presence-detection device 104. The computer-readable media may store a speech-recognition component 308 that, when executed by the processor(s) 302, perform speech-recognition on processed audio signal(s) to identify one or more voice commands represented therein. For instance, the speech-recognition component 308 may convert the audio signals into text data using automatic-speech recognition (ASR), and determine an intent for voice commands of the user 106 using natural-language understanding (NLU) on the text data. Thereafter, a command processor, stored in the computer-readable media 304 (and/or at a remote network-based system), may cause performance of one or more action in response to identifying an intent of the voice command. In the illustrated example, for instance, the command processor may issue an instruction to control a secondary device 108. For instance, the command processor may issue one or more instructions to the television 108(1) to show the weather channel, sends an instruction to dim the light 108(2), and/or output music using a loudspeaker 110.

The computer-readable media 304 may further store a signal-generation component 310 that, when executed by the processor(s) 302 generate audio signals/data that represent sound to be output by the loudspeaker(s) 110. The signal-generation component 310 may, for example, generate audio data representing ultrasonic signals that are output by the loudspeaker(s) 110 at a frequency that is above the audible range of humans. The signal-generation component 310 may generate ultrasonic signals at various power levels depending on, for example, a size of a room that the presence-detection device 104 is in. Further, the signal-generation component 310 may generate ultrasonic signals that are converted into sound by the loudspeaker(s) 110 according to various timing implementations, such as a continuously emitted sound, a pulsed sound, a periodically pulsed sound, etc. In some examples, the signal-generation component 310 may be configured to generate a calibration signal, such as an audio sweep signal, to determine audio characteristics of a room or other environment of the presence-detection device 104.

The computer-readable media 304 may further store a calibration component 312 configured to, when executed by the processor(s) 302, determine audio characteristics of an environment of the presence-detection device 104 and/or frequencies at which to output sound by the loudspeaker(s) 110. In some examples, the calibration component 312 may cause the signal-generation component 310 to generate audio data representing a calibration tone, such as an ultrasonic sweep signal, to determine audio characteristics of the environment of the presence-detection device 104. The calibration component 312 may perform device calibration to determine an optimal frequency range for ultrasonic signals to be emitted by the loudspeaker(s) 110 into the environment. In some examples, the calibration component 312 may cause the signal-generation component 310 to generate an ultrasonic sweep signal that, when converted into sound by the loudspeaker(s) 110, emits a sound over a period of time at a range of ultrasonic frequencies (e.g., 27 kHz-33 k Hz). The calibration component 312 may also activate at least one microphone in the microphone array 112 to generate audio data representing the ultrasonic sweep signal, and determine an optimal frequency range/bin for the environment. For instance, the calibration component 312 may analyze various frequency ranges included in the total frequency range of the ultrasonic sweep signal and determine signal-to-noise (SNR) values for one or more frequency ranges. The calibration component 312 may determine which sub-frequency range in the total frequency range of the ultrasonic sweep signal has the best SNR value.

In some examples, the calibration component 312 may cause utilize the ultrasonic sweep signal upon installation of the presence-detection device 104, after detecting movement, or the end of movement, using a sensor of the presence-detection device 104, and/or periodically in order to determine an optimal frequency at which to emit ultrasonic signals into an environment of the presence-detection device 104.

In some examples, the calibration component 312 may perform more passive techniques for determining acoustic characteristics of an environment of the presence-detection device 104. For instance, the calibration component 312 may, at least periodically, simply utilize at least one microphone in the microphone(s) 112 to generate audio data while the loudspeaker(s) 110 is not outputting sound. The calibration component 312 may analyze that audio data to determine background noise or sound in the environment of the presence-detection device 104. In this way, the calibration component 312 may detect noise that may be caused by other objects in the environment (e.g., television, ceiling fan, vacuum cleaner, etc.) that may interfere with analyzing audio data representing ultrasonic signals. In this way, the calibration component 312 may determine a background noise profile or signature that may later be used to help identify portions of audio data that represent reflections of the ultrasonic signal, rather than background noise. The calibration component 312 may provide an indication of a frequency at which to emit ultrasonic signals to the signal-generation component 310 in order to generate audio data/signals that represent the ultrasonic signals when converted by the loudspeaker(s) 110. In this way, the loudspeaker(s) 110 may emit ultrasonic signals that are at a more optimized frequency range based on audio characteristics of the environment.

The computer-readable media 304 may further include a signal-processing component 314 that, when executed by the processor(s) 302, perform various operations for processing audio data/signals generated by the microphone(s) 112. For example, the signal-processing component 314 may include components to perform low-pass filtering and/or high-pass filtering to ensure that speech and other sounds in the spectrum region of the ultrasonic signal does not affect baseband processing. For instance, the signal-processing component 314 may performing high-pass filtering for the audio data received in each audio channel for respective microphone(s) 112 to remove sounds at lower frequencies that are outside or lower than of the frequency range of the ultrasonic signal and/or reflected signals that have shifted, such as speech (e.g., 100 Hz, 200 Hz, etc.) or other sounds in the environment. Further, the signal-processing component 314 may perform baseband carrier shifts (e.g., at 96 kHz) to shift or modulate the audio signal back to baseband frequency from the carrier frequency (e.g., 46 kHz, 21 kHz, etc.). Additionally, the signal-processing component 314 may perform low-pass filtering for each audio signal generated by each microphone(s) 112 after the baseband carrier shift to remove signals from the audio signals that are higher than a certain cutoff frequency that is higher than audio signals representing the ultrasonic signal (e.g., a cutoff frequency of than 30 kHz, 33 kHz, 35 kHz, and/or any other cutoff frequency higher than the ultrasonic signal frequency range).

In some examples, the signal-processing component 314 may perform integer down sampling, such as digital sampling, to remove certain samples from the audio signals. For example, the signal-processing component 314 may perform any form of digital down sampling or decimation to reduce the sampling rate of the audio signals, such as down sampling at a rate of 2 kHz (or another appropriate frequency). In this way, the signal-processing component 314 may produce an approximation or representation of the audio signals generated by the microphone(s) 112, but at a lower frequency rate. After down sampling the audio signals, the signal-processing component 314 may perform various signal processing, such as windowing, Fourier Transformations, and/or logarithmic transformations. For example, the signal-processing component 314 may perform various types of transforms to convert the audio signal from the time domain into the frequency domain, such as a Fourier transform, a fast Fourier transform, a Z transform, a Fourier series, a Hartley transform, and/or any other appropriate transform to represent or resolve audio signals into their magnitude (or amplitude) components and phase components in the frequency domain. Further, the signal-processing component 314 may utilize any type of windowing function on the audio data, such as the Hanning Window, the Hamming Window, Blackman window, etc. Additionally, the signal-processing component 314 may perform a logarithmic transform on the magnitude components to transform the magnitude components of the frequency of the reflected signal. For instance, due to the high-dynamic range of the magnitude components of the frequency of the reflected ultrasonic signal, and because the amount of reflection that occurs from movement of the user 106 is relatively small (may appear similar to noise), the logarithmic transform may transform the magnitude components into a larger range. After applying a logarithmic transform to the magnitude components, the change in magnitude caused by the reflection of the ultrasonic signal off of the moving object, or person, will be more easily identifiable.

In this way, the signal-processing component 314 may generate magnitude components and phase components that represent the frequency components (magnitude and phase) of the audio signals that represent reflected signals that correspond to the ultrasonic signal. Generally, the magnitude components and phase components may be complex numbers that represent the audio signals at each frequency. Thus, the magnitude components and phase components may represent frequency content for audio signals from each audio channel generated by the microphone(s) 112 after various digital processing has been performed on the audio signals by the signal-processing component 314. The magnitude components may be represented as logarithmic values (dB), and the phase components may be represented by radian and/or degree values. In this way, the signal-processing component 314 may generate magnitude components and phase components representing audio signals generated by two or more microphones in the microphone(s) 112 over a period of time (e.g., 8 seconds).

The computer-readable media 304 may further store a feature-extraction component 320 that, when executed by the processor(s) 302, cause the processor(s) to extract the magnitude feature data 316 and phase feature data 318 from the magnitude and phase components generated by the signal-processing component 314. The feature-extraction component 320 may perform various operations for normalizing and stacking features of the magnitude components and phase components for each audio channel from the microphone(s) 112. For example, the feature-extraction component 320 may receive the complex numbers (e.g., magnitude components and phase components) and remove the first order statistics. Further, the feature-extraction component 320 may perform feature stacking to stack the magnitude components across N time intervals to create magnitude feature data 316, and stack the phase components to create phase feature data 318. In some examples, the feature-extraction component 320 may create the phase feature data 318 may determining differences between phase components of the different audio channel paths from the microphone(s) 112.

In some examples, the feature-extraction component 320 may further perform normalization and remove background noise. For instance, the presence-detection device 104 may, at least periodically, activate one or more microphone(s) 112 to generate audio signals representing background noise in an environment of the presence-detection device 104. The components of the presence-detection device 104 may analyze the background audio signal(s) representing the background noise, and the feature-extraction component 320 may further create background audio data which represents the background noise. Thus, once the feature-extraction component 320 has generated the magnitude feature data 316 and/or the phase feature data 318, the feature-extraction component 320 may utilize the background audio data to subtract, or otherwise remove, the representation of the background noise from the magnitude feature data 316 and/or the phase feature data 318. In this way, the feature-extraction component 320 may cause the background noise, such as a ceiling fan, a television, a refrigerator, etc., to not be represented in or by the magnitude feature data 316 and/or the phase feature data 318.

In some examples, the magnitude feature data 316 and the phase feature data 318 may generally represent binned frequency features over time, such as 1 dimensional binned frequency features over time that represent reflections of the ultrasonic signal. In various examples, the phase feature data 318 may comprise phase differences between multiple microphones, such as a phase difference between phase components of audio data generated at least in part by the respective microphones 206(1) and 206(2).

The computer-readable media 304 may further store a time-sequence classification component 322 configured to, when executed by the processor(s) 302, input the magnitude feature data 316 and the phase feature data 318 into one or more machine-learning model(s) 332 in order to classify the magnitude feature data 316 and/or phase feature data 318 as indicating movement of an object in the environment, a direction of the movement, and/or a number of objects moving in the environment. The machine-learning (ML) model(s) 332 may comprise any type of ML model(s) 332 (e.g., neural networks, linear regression, decision tree, Naïve Bayes, etc.) that may be trained to receive magnitude feature data 316 and phase feature data 318 as inputs, and determine outputs indicating whether the magnitude feature data 316 and phase feature data 318 represent movement of an object, a direction of that movement, and/or a number of objects moving.

The time-sequence classification component 322 may further perform various techniques to train the ML model(s) 332. For instance, an ML model(s) 332, such as a neural network, may be trained with training data (e.g., magnitude feature data 316 and phase feature data 318) that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the ML model(s) 332 may be trained to identify input feature vector as representing reflections of ultrasonic signals that reflected off a moving object, or that did not reflect off a moving object.

Further, the ML model(s) 332 may additionally be trained to identify the direction of movement of the object through the environment. The microphone array 112 may include multiple microphones that generate, or otherwise are used to create, multi-channel feature data for frequency components of the reflection of the ultrasonic signal, such as phase components and phase feature data 318. The ML model(s) 332 may be trained using phase feature data 318 representing the phase components, or phase feature data 318 representing differences between the phase components, from multiple microphone(s) 112. For instance, the ML model(s) 332 may be trained to identify, based on a comparison between phase components representing the reflection of the ultrasonic signal detected by two different microphones 206, a direction of the object as it moves through the environment.

In even further examples, the ML model(s) 332 may be trained to determine a number of people in the environment that are moving. As an example, the microphone(s) 112 in the presence-detection device 104 may include multiple microphones to generate, at least partly using various components of the presence-detection device 104, phase feature data 318, the model(s) 332 may identify, from the differences in phase components for audio signals generated by multiple microphones represented in the phase feature data 318, movement at various angles (in degrees or radians) that indicate multiple objects moving. For example, the phase feature data 318 may indicate that movement is detected at substantially 180 degrees from a defined axis of the microphone(s) 112, and also at substantially 30 degrees from the defined axis. The ML model(s) 332 may be trained to determine that, if the difference in the angles are large enough, or over a threshold difference, multiple objects must be moving in the environment rather than one large object.

The computer-readable media 304 may further store a context component 324 configured to, when executed by the processor(s) 302, aggregate and communicate various contextual information between components. For example, the context component 324 may receive, and potentially further analyze, calibration data received from the calibration component 312, such as environment calibration data and/or device calibration data.

Further, the context component 324 may further receive classification results data from the time-sequence classification component 322. For example, the time-sequence classification component 322 and/or the ML model(s) 322 may analyze the magnitude feature data 316 and the phase feature data 318 and output confidence scores associated with one or more of (i) detecting movement of an object, (ii) detecting a direction of the movement, and (iii) detecting one or multiple objects moving in the environment of the presence-detection device 104. The context component 324 may be configured to determine if those confidence scores are above or below threshold values, and also determine actions for the presence-detection device 104 to perform based on the confidence scores being above or below threshold values. Generally, the threshold values may be associated with confidence values that indicate a high-degree, or sufficiently high-degree, of certainty that movement was detected, a direction of the movement, and/or that multiple objects were detected as moving. For instance, if the ML model(s) 332 outputs confidence scores that are higher than an 85% chance that movement was detected, the context component 324 may confirm or determine that movement was in fact detected and perform various operations. The confidence threshold values may be adjusted as desired, such as to err on various sides of detecting movement, or not detecting movement. For instance, the context component 324 may have fairly high threshold values in order to prevent the presence-detection device 104 from performing operations in instances where movement was incorrectly identified due to a lower threshold value.

The computer-readable media 304 may further store a context component 324 configured to, when executed by the processor(s) 302, cause the processor(s) 302 to play audio such as music songs or other audio files. The audio-player component 326 may cause audio data to be provided to the loudspeaker(s) 110 to be converted into sound. In some examples, prior to providing the audio data to the loudspeaker(s) 110, the audio data may be stored in an audio-data buffer 330. In such examples, the signal-generation component 310 (or another component) may analyze the audio data stored in the audio-data buffer 330 and determine how to mix the audio data, such as music data, with audio data representing the ultrasonic signal such that the output sound does not experience saturation. Further description of the mixing is found with reference to FIG. 6.

The computer-readable media 304 may further store the AEC component 226 that is configured to, when executed by the processor(s) 302, analyze audio signals to remove distortions in the reflected signal 216 of the audio signal 214 caused by the concurrent output of the audible sound 116. Generally, the AEC component 226 may be any component capable of performing acoustic echo cancellation techniques. The AEC component 226 may be configured to process audio signals and/or audio data in the time domain and/or frequency domain, and may include techniques for performing adaptive filtering (e.g., least mean square, recursive least square, etc.). The adaptive filter may be frequency based, such as using a Fast Fourier transform (FFT). The AEC component 226 may receive an audio signal 214 that represents a reflected ultrasonic signal 216 as well as an audible signal 218 that represents audible sound 116 emitted at least partly which the ultrasonic signal 208 is output. There may be distortions in the frequency range of the reflected signal 216 caused by the concurrent output of the audible sound 116 with the ultrasonic signal 208. However, the distortions in the frequency range of the reflected signal 216 may generally mirror, or be correlated with, the audible sound 116. The AEC component 226 may receive the audio signal 214, as well as a reference signal 224 that represents the audible sound 116. In some instances, the reference signal 224 may be generated using the audio data 220 using a same sampling rate as the audio signal 214 (e.g., 2 kHz). The reference signal 224 may be generated at a same frequency range, or at a same carrier frequency, as the audio signal 214. In some instances, the audio signal 214 may be demodulated down to a same frequency range and/or at a same carrier frequency as the reference signal 224.

The AEC component 226 may then use the reference signal 224 to remove the distortions in the reflected signal 216 portion of the audio signal 214. That is, because the distortions in the reflected signal 216 generally correspond to, mirror, or are otherwise correlated to the audible sound 116, the reference signal 224 may mirror or correspond to the distortions. The AEC component 226 may remove, attenuate, etc., the distortions in the reflected signal 216 by removing the portions that correspond to the reference signal. the output of the AEC component 226 may then be the audio signal 214 that represents the reflected signal 216 such that the distortions in the reflected signal 216 are caused by the Doppler effect, rather than the distortions caused by the concurrent output of the audible sound 116.

The presence-detection device 104 may comprise any type of portable and/or fixed device and include one or more input devices 334 and output devices 336. The input devices 334 may include a keyboard, keypad, lights, mouse, touch screen, joystick, control buttons, etc. The output devices 336 may include a display, a light element (e.g., LED), a vibrator to create haptic sensations, or the like. In some implementations, one or more loudspeakers 110 may function as output devices 336 to output audio sounds.

The presence-detection device 104 may have one or more network interfaces 338 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols.

The network interface(s) 338 may enable communications between the presence-detection device 104 and the secondary devices 108, as well as other networked devices. Such network interface(s) can include one or more network interface controllers (NICs) or other types of transceiver devices to send and receive communications over a network.

For instance, the network interface(s) 338 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 338 may include a wide area network (WAN) component to enable communication over a wide area network. The networks may represent an array of wired networks, wireless networks, such as WiFi, or combinations thereof.

Figure 4:
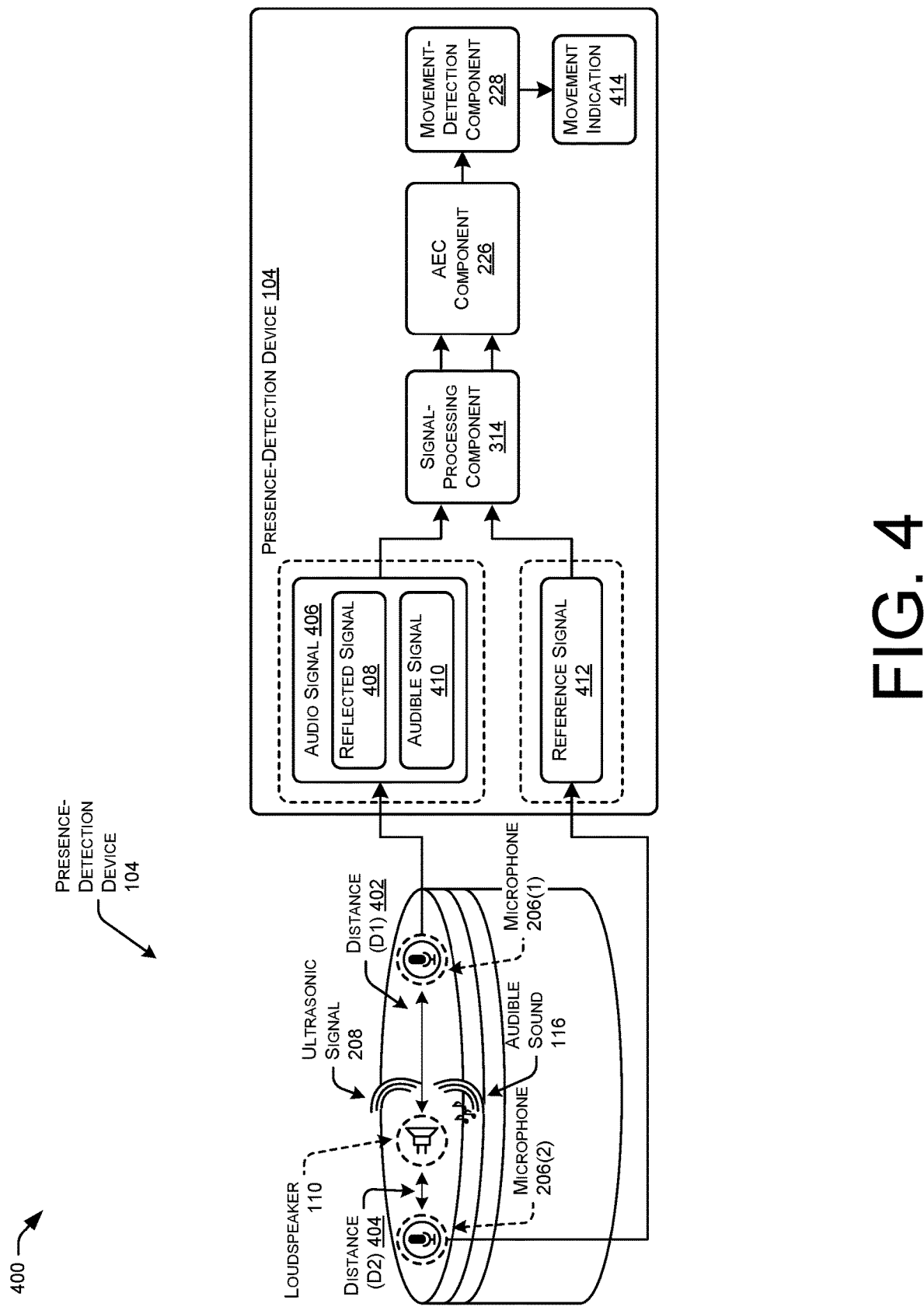
FIG. 4 illustrates an example high-level process for a presence-detection device to use a reference signal generated from a microphone near the loudspeaker of the device as an input into an acoustic-echo cancellation (AEC) component to remove distortion from the audio signal caused by concurrent audio playback.

FIG. 4 illustrates an example high-level process 400 for a presence-detection device 104 to use a reference signal generated from a microphone near the loudspeaker of the device as an input into an acoustic-echo cancellation (AEC) component to remove distortion from the audio signal caused by concurrent audio playback.

As illustrated, the presence-detection device 104 may include a first microphone 206(1) located a distance (D1) 402 from the loudspeaker 110, and a second microphone 206(2) located a second distance D2 404 from the loudspeaker 110, where the distance 404 is less than the distance 402.

The first microphone 206(1) may generate an audio signal 406 representing a reflected signal 408 and an audible signal 408. Further, the second microphone 206(2) may generate a reference signal 412. That is, the second microphone 206(2) may be located in closest proximity, or in close proximity, to the loudspeaker 110 and may be used to generate the reference signal 412 that represents the audible sound 116 with more strength as compared to the reflected signal 408. The reference signal 412 may represent the audible sound 116 with more strength (e.g., higher decibels (dB)) as compared to the audio signal 406 generated by the microphone 206(1) located further from the loudspeaker 110. The audio signal 406 may be processed using an AEC component 226 and the reference signal 412 to remove (or attenuate) the portion of the audio signal representing the audible sound (e.g., the audible signal 410 representing the distortions) to help isolate the reflection signals 408 for further analysis to detect movement. The movement-detection component 228 may process the audio signal 406 that represents the reflected signal 408 and output a movement indication 414 (e.g., movement detected, no movement detected, likelihood of movement, etc.).

Figure 5:
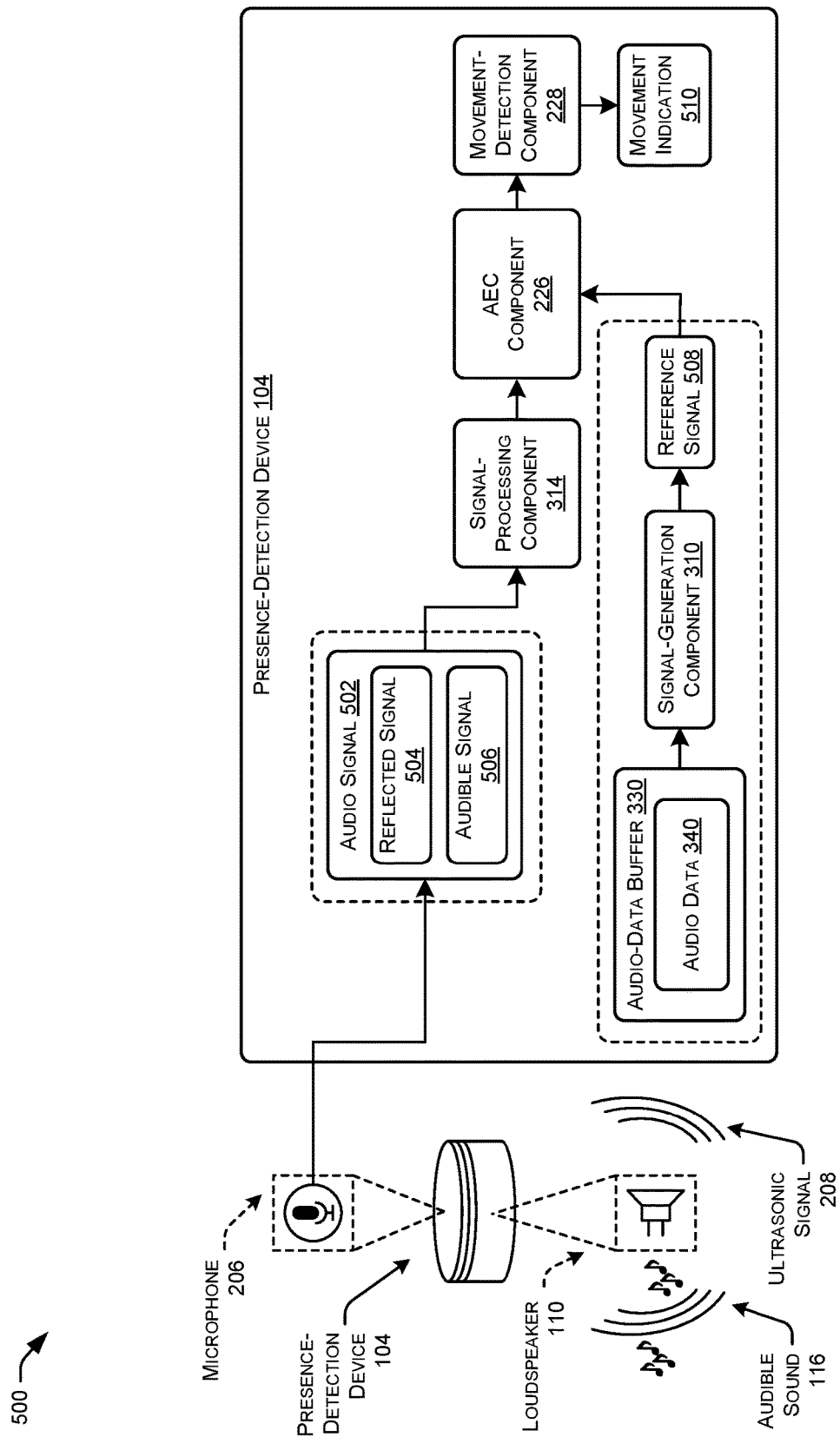
FIG. 5 illustrates an example high-level process for a presence-detection device to use a reference signal generated using audio data in a buffer of the device as an input into an acoustic-echo cancellation (AEC) component to remove distortion from the audio signal caused by concurrent audio playback.

FIG. 5 illustrates an example high-level process 500 for a presence-detection device v104 to use a reference signal generated using audio data in a buffer of the device as an input into an acoustic-echo cancellation (AEC) component to remove distortion from the audio signal caused by concurrent audio playback.

The presence-detection device 104 may use one or more microphones 206 to generate an audio signal 502 that represents reflection signals 504 that have distortions caused by concurrent output of audible sound by the loudspeaker, where the distortions are represented by an audible signal 506 that is correlated with the audible sound 116. In one example, the presence-detection device 104 may use an AEC component 226 to remove the distortions where the reference signal 508 is generated by the signal-generation component 310 using audio data 340 stored in the audio-data buffer 330 of the device that is used by the loudspeaker 110 to output the audible sound 116. For instance, the signal-generation component 310 may use the audio data 340 to generate a reference signal 508 that corresponds to the audible sound 116, and that reference signal 508 may be used to remove the distortions from the audio signal 502 using the AEC component 226. Using the AEC techniques, the AC component 226 may use the reference signal 508 to remove the distortions (e.g., audible signal 506) in the reflected signal 504 represented in the audio signal 502 to help isolate the reflected signal 504. The movement-detection component 228 may process the audio signal 502 that represents the reflected signal 504 and output a movement indication 510 (e.g., movement detected, no movement detected, likelihood of movement, etc.).

Figure 6:
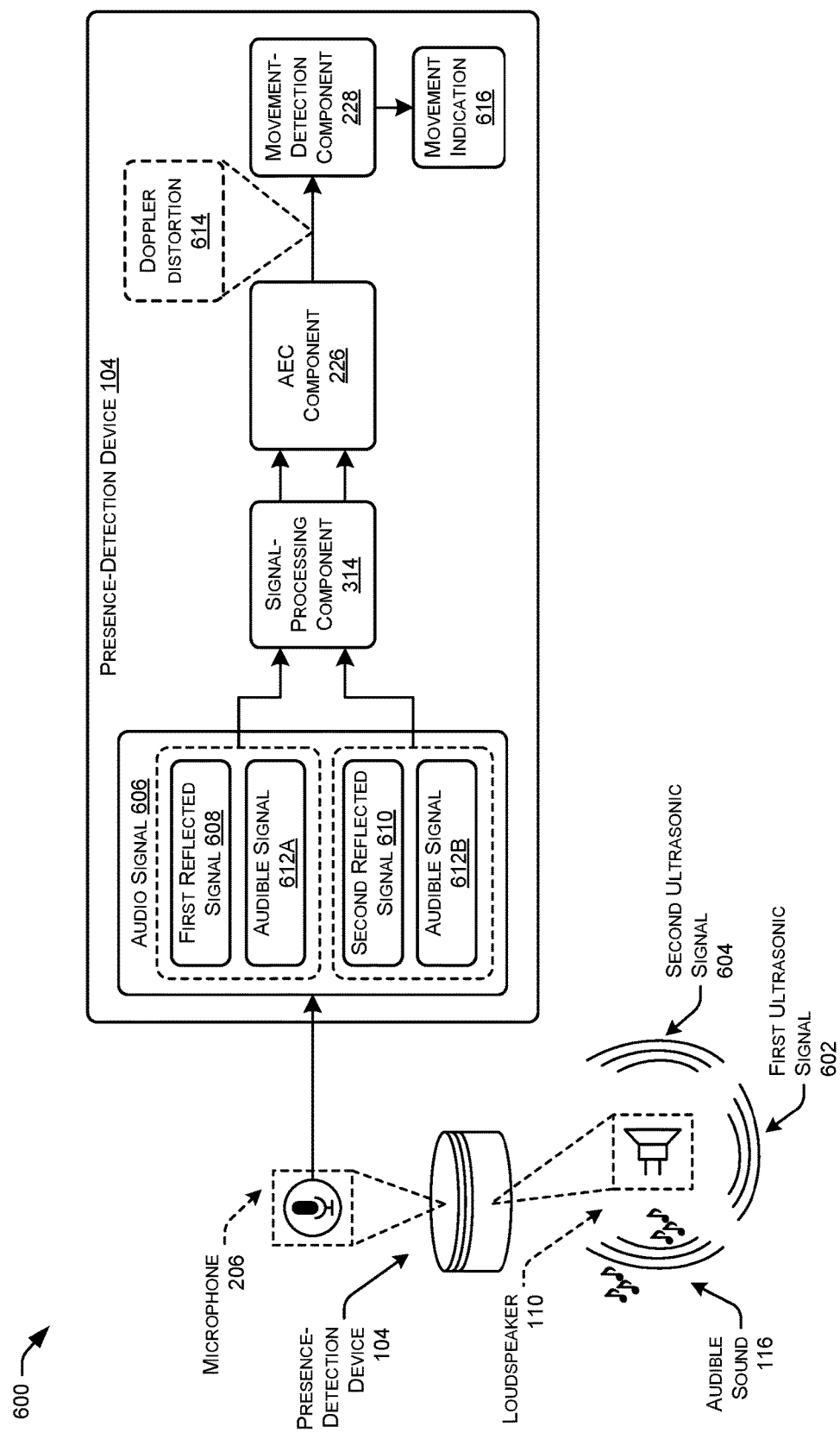
FIG. 6 illustrates an example high-level process for a presence-detection device to emit two ultrasonic signals at different ultrasonic frequencies in order to isolate distortion in the reflected signals caused by concurrent audio playback, and identify distortion in the reflected signals caused by a user moving through an environment.

FIG. 6 illustrates an example high-level process 600 for a presence-detection device 104 to emit two ultrasonic signals 602 and 604 at different ultrasonic frequencies in order to isolate distortion in the reflected signals 608 and 610 caused by concurrent audio playback, and identify distortion in the reflected signals caused by a user moving through an environment.

That is, the presence-detection device 104 may not only emit the ultrasound signal 604 and the audible sound 116, but may further concurrently emit another ultrasound signal 604 into the environment. Thus, the presence-detection device 104 may be configured to emit a first ultrasound signal 602 and a second ultrasound signal 604 into the environment while outputting the audible sound 116. The first ultrasound signal 602 and the second ultrasound signal 604 may be emitted in different frequency ranges that are spaced apart (e.g., 32 kHz and 44 kHz). A microphone 206 of the device 104 may generate an audio signal 606 that represents first reflection signals 608 with first audible signals 612A, and second reflection signals 610 and second audible signal 612B that represent reflections of the first ultrasound signal 602 and the second ultrasound signal 604. Generally, the distortion caused by the concurrent output of the audible sound 116 may be experienced in both of the first reflection signal 608 and the second reflection signal 610 such that the distortions (e.g., audible signal 612A and audible signal 612B) are symmetric, or mirror each other, across the different reflection signals. However, the amount of Doppler effect is directly proportional to the frequency of emission, and when the two ultrasonic signals 602 and 604 are emitted at different frequencies that are sufficiently spaced apart, the Doppler spread will be represented differently in the first reflection signal 608 and the second reflection signal 610. Accordingly, the device 104 (e.g., signal-processing component 314) may process the audio signal 606 and extract first feature data representing the frequency range of the first reflection signal 608, extract second feature data representing the frequency range of the second reflection signal 610, and input the first and second feature data into an AEC component 226. The AEC component 226 may be configured to identify, and remove, portions of the first feature data and the second feature data that are correlated, symmetric, or otherwise correspond to each other, which may be the portions representing the audible noise. Accordingly, the output of the AEC component may be the portions that are not correlated, which may be the portions of the first and second feature data that represent the reflection signals 608 and 610. In this way, the AEC component 226 may isolate the feature data representing the reflection signals, 608 and 610 and thus the Doppler effect, for further use in detecting movement of a user in the environment. The movement-detection component 228 may process the audio signal 606 that represents the reflected signals 608 and 610 and output a movement indication 616 (e.g., movement detected, no movement detected, likelihood of movement, etc.).

Figure 7:
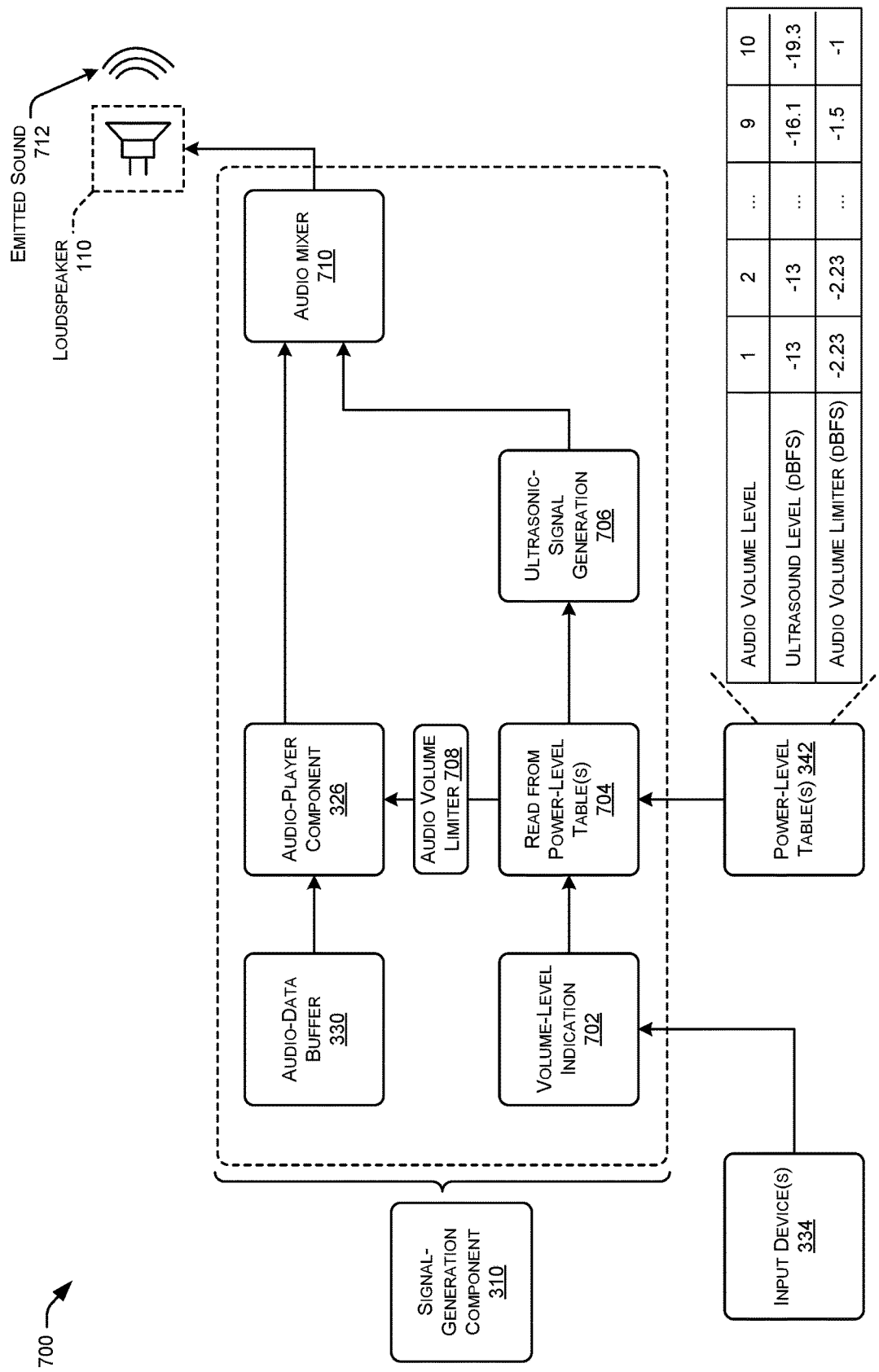
FIG. 7 illustrates an example process for determining power levels at which to concurrently emit an ultrasonic signal and audible audio using a loudspeaker in order to prevent clipping of the audible audio data caused by the loudspeaker of a presence-detection device.

FIG. 7 illustrates an example process 700 for determining power levels at which to concurrently emit an ultrasonic signal and audible audio using a loudspeaker in order to prevent clipping of the audible audio data caused by the loudspeaker of a presence-detection device.

In some examples, the signal-generation component 310 may analyze audio data stored in the audio-data buffer 330, such as music data. For example, the presence-device 104 may buffer music data in the audio-data buffer 330 prior to causing the loudspeaker(s) 110 to convert the music data into sound. Further, an audio-player component 326 may receive a volume-level indication 702 via an input device 334 (e.g., voice command, volume knob, touch screen, etc.). The volume-level indication 702 may indicate a power-level, or volume level, at which the audible sound 116 is to be output by the loudspeaker 110.

The signal-generation component 310 may perform, at 704, one or more reads from the power-level table(s) 342 using the volume-level indication 702 to determine a power level at which to emit the ultrasonic sound 114. The signal-generation component 310 may query or search the one or more power-level tables 342 to determine a power level at which to emit the ultrasonic sound 114. The power-level tables 342 may indicate, for different audio volume levels, corresponding ultrasound levels (e.g., in dBFS) at which to emit the ultrasonic sound 114 to avoid clipping by the loudspeaker 110. The signal-generation component 310 may select an ultrasound power level using the power-level tables 342 and the volume-level indication 702, and at 706, generate an ultrasonic signal to be emitted at the determined power level. Further, the signal-generation component 310 may use the volume-level indication 702 and read, from the power-level table(s) 342 an audio volume limiter value indicating a limiter threshold for the audio-player component 326. The audio-volume limiter may be provided to the audio-player component at 708, and the audio-player component 326 may limit the volume, or power level, at which the audible sound is output based on the received audio volume limiter value 708.

At 710, the signal-generation component 310 may mix (audio mixer 710) the audio data representing the ultrasonic signal into the portion of the music data such that saturation and/or clipping is avoided when the resulting mixed audio data is converted into emitted sound 712 by the loudspeaker 110.

Figure 8:
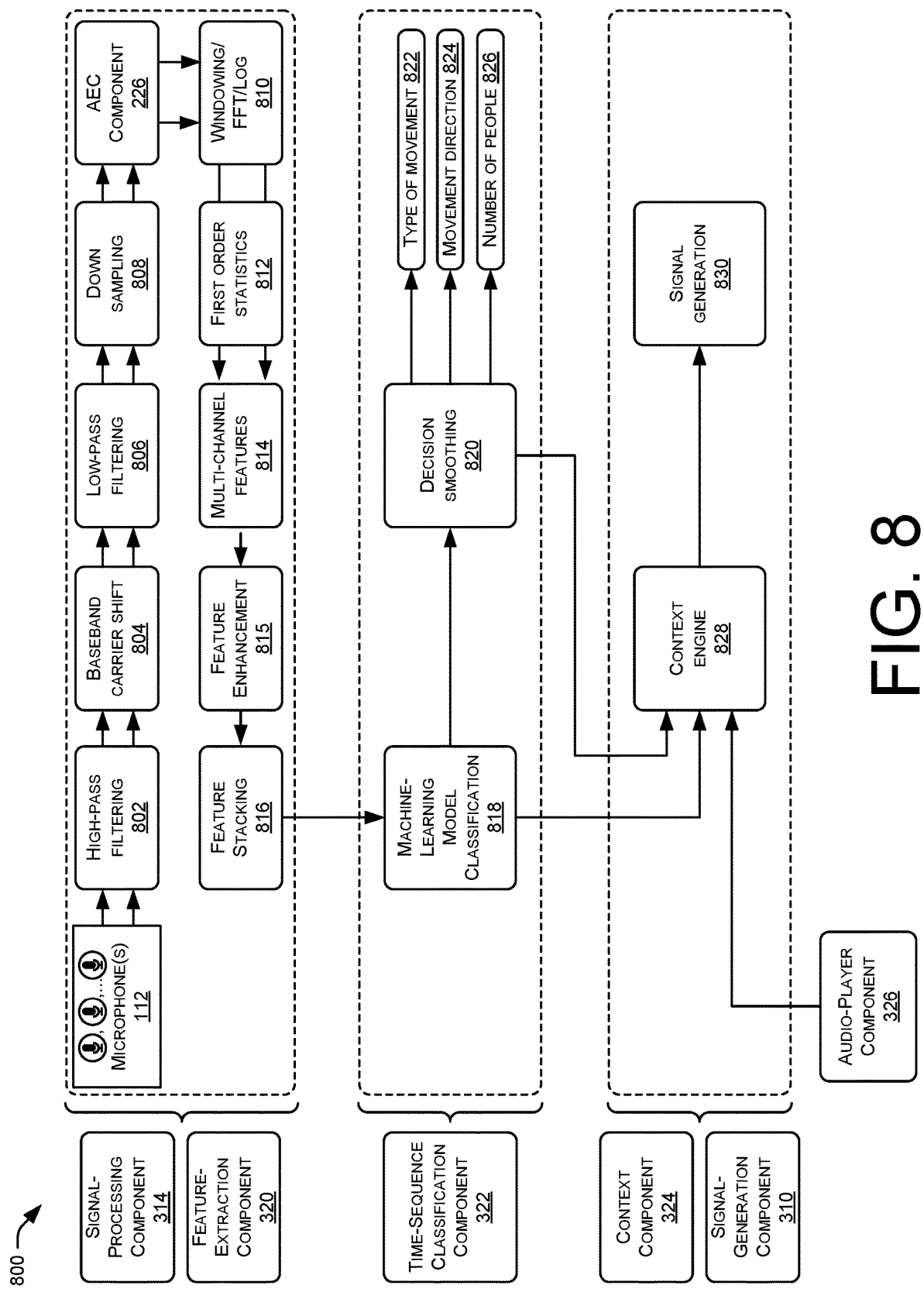
FIG. 8 illustrates an example of a high-level process for generating and emitting an ultrasonic signal into an environment, and analyzing audio data representing reflections of the ultrasonic signal off objects in the environment to detect presence or a user.

FIG. 8 illustrates an example of a high-level process 800 for generating and emitting an ultrasonic signal into an environment, and analyzing audio data representing reflections of the ultrasonic signal off objects in the environment to detect presence or a user.

At illustrated, one or more microphone(s) 112 in an array may generate multi-channel audio data. The signal-processing component 314 may perform high-pass filtering on the multi-channel audio data at 802 to remove audio data in unwanted frequencies, baseband carrier shift at 804 to modulate the audio signal back to baseband frequency from carrier frequency, perform low-pass filtering on the multi-channel audio data at 806 to remove audio data in unwanted frequencies, and perform down sampling on the multi-channel audio data streams at 808 to produce an approximation or representation of the audio signals generated by the microphone(s) 112, but at a lower frequency rate. The audio signal(s) may be input into the AEC component 226, such as an audio signal representing a reflection signal along with distortion caused by a concurrently output audible sound as well as a reference signal representing the audible sound. The AEC component 226 may remove the portion of the audio signal representing the audible sound using the reference signal, and output an audio signal that represents the reflection signals.

The signal-processing component 314 may, at 810, then perform windowing, fast Fourier transforms, and logarithmic transforms on the audio data at 810 to generate magnitude feature data 316 and phase feature data 318. The feature-extraction component 320 may identify the first order statistics of the magnitude and frequency components in the magnitude feature data 316 and phase feature data 318, and generate multi-channel features at 814. For example, the feature-extraction component 320 may select magnitude feature data 316 from one of the multi-channel audio streams, and also determine phase feature data 318 that represents differences in phase components between phase components for two audio streams from two microphones.

At 815, the feature-extraction component 320 (and/or another component) may perform one or more feature enhancement operations. For example, the feature-extraction component 320 may perform background means subtraction where background noise is removed from the feature data. For instance, the magnitude feature data 316 and phase feature data 318 may take a long-term average of the features and subtract it over the current frame. As another example, the magnitude feature data 316 and phase feature data 318 may utilize a minimum statistics-based method where the minimum across the observed features is subtracted from each of the features. in another example, the magnitude feature data 316 and phase feature data 318 may perform variance-based normalization on the feature data.

At 816, the feature-extraction component 320 may perform feature stacking using the magnitude feature data 316 and phase feature data 318 to generate binned audio feature data over time. For example, the magnitude feature data 316 may comprise a 1-dimensional vector, and the phase differences between phase components be also be a 1-dimensional array representing audio data streams over a period of time that represent the ultrasonic signal reflected off objects in the environment.

At 818, the time-sequence classification component 322 may perform machine-learning model classification. For instance, the time-sequence classification component 322 may input the magnitude feature data 316 and phase feature data 318 received from the feature stacking at 818 in the ML model(s) 332. The ML model(s) 318 may output binary answers (e.g., "1" or "0," "yes" or "no<," etc.) and/or probability scores that indicate one or more of (i) motion of a person, (ii) a direction of the motion of the person, or (iii) a number of people in the room. At 820, the time-sequence classification component 322 may perform decision smooth to ensure that the ML model(s) 332 did not output a false positive. For example, the time-sequence classification component 322 may perform similar techniques using the ML model(s) 332 for a subsequent period of time that at least partly overlaps with the period of time for which audio data that was just analyzed. If the audio data representing the ultrasonic signal for the partly overlapping period of time also indicates the same answer regarding movement, direction of movement, and/or number of people, the time-sequence classification component 322 may determine that there was not a false positive (and determine there was a false positive if not).

The time-sequence classification component 322 may then output at least one of a type of movement at 822 (e.g., no movement, minor movement, major movement, etc.), a movement direction 824 relative to the presence-detection device 104, and/or a number of people 826 in the environment. In some examples, the time-sequence classification component 322 may determine that the objects moving are people based at least in part on a line-of-sight of the presence-detection device 104 (or the loudspeaker(s) 110 and/or microphone(s) 112).

In some examples, the context component 324 may provide inputs in the context engine 828 in order to drive the signal-generation component 310 to perform signal generation at 830. For example, the context component 324 may provide input into signal generation 820 indicating an optimized signal frequency, how to mix the audio data representing the ultrasonic signal with other audio data that is provided to the loudspeaker(s) 110 to be converted into sound, an indication of a type of ultrasonic signal to emit (e.g., continuous, periodic, etc.) and/or other data.

Figure 9:
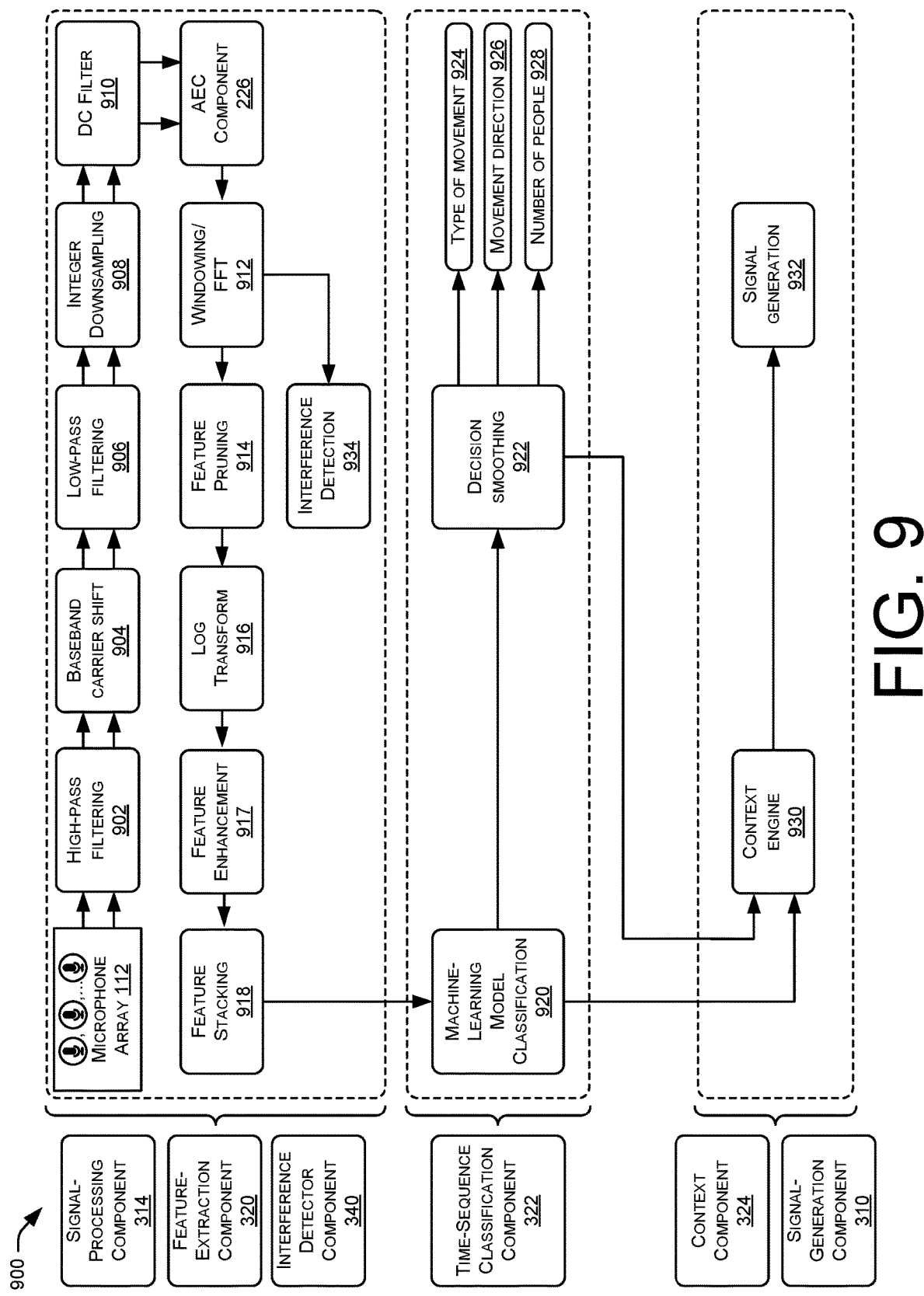
FIG. 9 illustrates another example of a high-level process for generating and emitting an ultrasonic signal into an environment, and analyzing audio data representing reflections of the ultrasonic signal off objects in the environment to detect presence of a user.

FIG. 9 illustrates another example of a high-level process 900 for generating and emitting an ultrasonic signal into an environment, and analyzing audio data representing reflections of the ultrasonic signal off objects in the environment to detect presence of a user.

At illustrated, one or more microphone(s) 112 may generate multi-channel audio data. The signal-processing component 314 may perform high-pass filtering on the multi-channel audio data at 902 to remove audio data in unwanted frequencies. For example, the signal-processing component 314 may apply the high-pass filter at 902 such that portions of the audio signals that representing speech and other sounds in the spectrum are attenuated and/or removed from the audio signals.

At 904, the signal-processing component 314 may perform a baseband carrier shift to downsample or otherwise modulate the audio signal(s) back to a lower frequency than the carrier frequency. For instance, the carrier frequency may generally be emitted from the device 104 in an ultrasonic signal range, such as anywhere between 20 kHz to 96 kHz. For instance, the carrier frequency at which the ultrasonic signal 114 is emitted may be approximately at 46 kHz. The signal-processing component 314 may perform a baseband carrier shift to shift the frequency of the audio signals down to, for example, a 1 kHz signal or a 2 kHz signal.

Take an example where the carrier frequency may be a 30 kHz frequency. In such examples, the reflection signal in the audio signal may be present between 31 kHz and 33 kHz. During the baseband carrier shift, the sample rate may be 96 kHz such that the frequency information between 31 kHz and 33 kHz is wrapped between −1 kHz and 1 kHz.

In some examples, the baseband carrier shift at 904 may comprise downsampling using a sinusoidal function such that the center frequency of the audio/analog signal representing the ultrasonic signal and the reflection signal is at 0 Hz. However, because a sinusoidal function is used, the negative portion of the analog signal may be flipped such that, rather than being in a range from (for example) −2 kHz to 2 kHz, the audio signal may be from 0 Hz to 2 kHz. That is, the negative portion maybe flipped onto the positive portion and the center frequency may be at 0 Hz. In such an example, the portion of the audio signal that represents the emitted ultrasonic signal may be around 0 Hz (e.g., DC frequency) and the portion of the audio signal that represents the reflection signal may be around 200 Hz or 300 Hz (as an example).

At 906, the signal-processing component 314 may apply a low-pass filter at 906 to remove any distortions in the audio signals. For instance, the low-pass filter at 906 may act as an anti-aliasing filter for later downsampling where the low-pass filter may have a cutoff frequency of 1 kHz, and anything beyond that is attenuated by, for instance, a $10^{th}$ order filter.

At 908, the signal-processing component 314 may perform integer downsampling. For instance, the signal-processing component 314 may perform integer downsampling on the audio signal to sample down to a 2 kHz sample rate, as opposed to a 96 kHz sample rate. The audio signal may be input into the AEC component 226, such as an audio signal representing a reflection signal along with distortion caused by a concurrently output audible sound as well as a reference signal representing the audible sound. The AEC component 226 may remove the portion of the audio signal representing the audible sound using the reference signal, and output an audio signal that represents the reflection signals.

At 910, the signal-processing component 314 may apply a DC filter 910, such as a high-pass filter, in order to attenuate frequencies around DC (e.g., 0 Hz). For instance, much of the energy in the audio signals may be around 0 Hz, such as energy from the emitted ultrasonic signal. The DC high-pass filter at 910 may have a cutoff frequency that attenuates those signals, such as a cutoff frequency of 12 Hz (and/or in a range of 0 Hz to 20 Hz). Thus, the DC high-pass filter may attenuate signals with frequencies around DC, but the Doppler shifts of the audio signals may be in a range of 200 Hz to 500 Hz, and will not be attenuated. Further, the negative portions of the audio signals may be attenuated and/or removed as well in such examples. Thus, while the Doppler shifts may be found at positive 200 Hz to 500 Hz, the negative portions may be attenuated or removed to reduce the amount of processing required on the audio signals. Thus, the amount of processing required is reduced, and the carrier frequency is attenuated or otherwise removed from the audio signals using the DC filter at 910.

The signal-processing component 314 may, at 912, then perform windowing and fast Fourier transforms (FFT(s)) on the audio data at to generate magnitude feature data 316 and phase feature data 318. The windowing may be any type of windowing, such as Hann and Hamming windows, blackman windows, nuttall windows, and/or any type of windowing known in the art. Similarly, the FFT may comprise any type of FFT to transform the audio signals from the time domain into the frequency domain.

The feature-extraction component 320 may perform feature pruning at 914 for cleaning up the feature data for classification, and may further apply a logarithm transform at 916 on the magnitude components to transform the magnitude components of the frequency of the reflected signal. For instance, due to the high-dynamic range of the magnitude components of the frequency of the reflected ultrasonic signal, and because the amount of reflection that occurs from movement of the user 106 is relatively small (may appear similar to noise), the logarithmic transform may transform the magnitude components into a larger range. After applying a logarithmic transform at 916 to the magnitude components, the change in magnitude caused by the reflection of the ultrasonic signal off of the moving object, or person, will be more easily identifiable.

At 917, the feature-extraction component 320 (and/or another component) may perform one or more feature enhancement operations. For example, the feature-extraction component 320 may perform background means subtraction where background noise is removed from the feature data. For instance, the magnitude feature data 316 and phase feature data 318 may take a long-term average of the features and subtract it over the current frame. As another example, the magnitude feature data 316 and phase feature data 318 may utilize a minimum statistics-based method where the minimum across the observed features is subtracted from each of the features. in another example, the magnitude feature data 316 and phase feature data 318 may perform variance-based normalization on the feature data.

At 918, the feature-extraction component 320 may perform feature stacking using the magnitude feature data 316 and phase feature data 318 to generate binned audio feature data over time. For example, the magnitude feature data 316 may comprise a 1-dimensional vector, and the phase differences between phase components be also be a 1-dimensional array representing audio data streams over a period of time that represent the ultrasonic signal reflected off objects in the environment.

At 920, the time-sequence classification component 322 may perform machine-learning model classification. For instance, the time-sequence classification component 322 may input the magnitude feature data 316 and phase feature data 318 received from the feature stacking at 918 in the ML model(s) 332. The ML model(s) 318 may output binary answers (e.g., "1" or "0," "yes" or "no<," etc.) and/or probability scores that indicate one or more of (i) motion of a person, (ii) a direction of the motion of the person, or (iii) a number of people in the room. At 922, the time-sequence classification component 322 may perform decision smooth to ensure that the ML model(s) 332 did not output a false positive. For example, the time-sequence classification component 322 may perform similar techniques using the ML model(s) 332 for a subsequent period of time that at least partly overlaps with the period of time for which audio data that was just analyzed. If the audio data representing the ultrasonic signal for the partly overlapping period of time also indicates the same answer regarding movement, direction of movement, and/or number of people, the time-sequence classification component 322 may determine that there was not a false positive (and determine there was a false positive if not).

In some instances, the machine-learning model(s) 332 may comprise a convolutional neural network that includes one or more layers, followed by a max pooling layer, then one or more densely connected layers, followed by a loss function. Generally, the distortion in the reflected signal caused by the audible sound 116 is mirrored, or symmetric, on each side of the carrier frequency. However, the Doppler effect may asymmetric on each side of the carrier frequency. Accordingly, the ML model(s) 332 may be configured to fold a feature map representing the reflected signals and distortions along the carrier frequency (which may be demodulated down to 0 Hz, in some instances) to get two channels. The folded feature map may then be fed into a convolution neural network and the neural network may compare the upper part of the feature map with the lower part of the feature map to determine differences and/or similarities between the upper part and lower part. Any correlations between the upper part and lower part may be attributed to the audible sound, and any differences (e.g., greater than a threshold amount of difference) between the upper part and lower part may be attributed to the Doppler effect.

The folded feature map may be fed into one or more consecutive convolutional layers, and the resolution of the features may get lower through the layers until the feature map reaches the max pooling layer. The ML model(s) 332 the analyzes the whole area of the feature map, and captures a pattern in the map. That is, the ML model(s) 332 may analyze the whole feature map, capture the difference between the upper and lower parts, and Captures a difference and marks it as movement. After this, the ML model(s) 332 may perform classification tasks by using a global pooling portion. The ML model(s) 332 utilizes a loss function, which may mean square error loss function. In some instances, the ML model(s) 332 may determine that symmetric portions of the upper part and lower part represent the audible sound, and that the non-symmetric portions of the upper part and the lower part represent the Doppler effect distortions caused by movement of an object, such as a user.

The time-sequence classification component 322 may then output at least one of a type of movement at 924 (e.g., no movement, minor movement, major movement, etc.), a movement direction 926 relative to the presence-detection device 104, and/or a number of people 928 in the environment. In some examples, the time-sequence classification component 322 may determine that the objects moving are people based at least in part on a line-of-sight of the presence-detection device 104 (or the loudspeaker(s) 110 and/or microphone(s) 112).

In some examples, the context component 324 may provide inputs in the context engine 930 in order to drive the signal-generation component 310 to perform signal generation at 932. For example, the context component 324 may provide input into signal generation 932 indicating an optimized signal frequency, how to mix the audio data representing the ultrasonic signal with other audio data that is provided to the loudspeaker(s) 110 to be converted into sound, an indication of a type of ultrasonic signal to emit (e.g., continuous, periodic, etc.) and/or other data.

In some examples, an interference-detector component 340 may continuously, or periodically, perform interference detection at 934 while the techniques described above are performed. Generally, the interference-detector component 340 may analyze the background noise and performance value to determine whether a new carrier frequency needs to be used by the signal generation 932. The interference-detector component 340 monitors the background noise to determine performance (e.g., SNR values being greater than or less than performance thresholds), and if poor performance is detected (e.g., SNR being less than a performance threshold). The interference may be continuous, pulsing, periodic, etc. In examples where the interference causes poor performance for more than a threshold amount of time over a period of time (e.g., more than 50% of the time over a 5 minute period), the interference-detector component 340 may determine that the interference is too severe and a new carrier frequency needs to be used. The interference-detector component 340 may then cause the calibration component 312 to emit sweep signal and identify a new optimized carrier signal. The interference-detector component 340 may then instruct the signal generation component 310 to generate a new signal at a different carrier frequency at 932.

Figure 10:
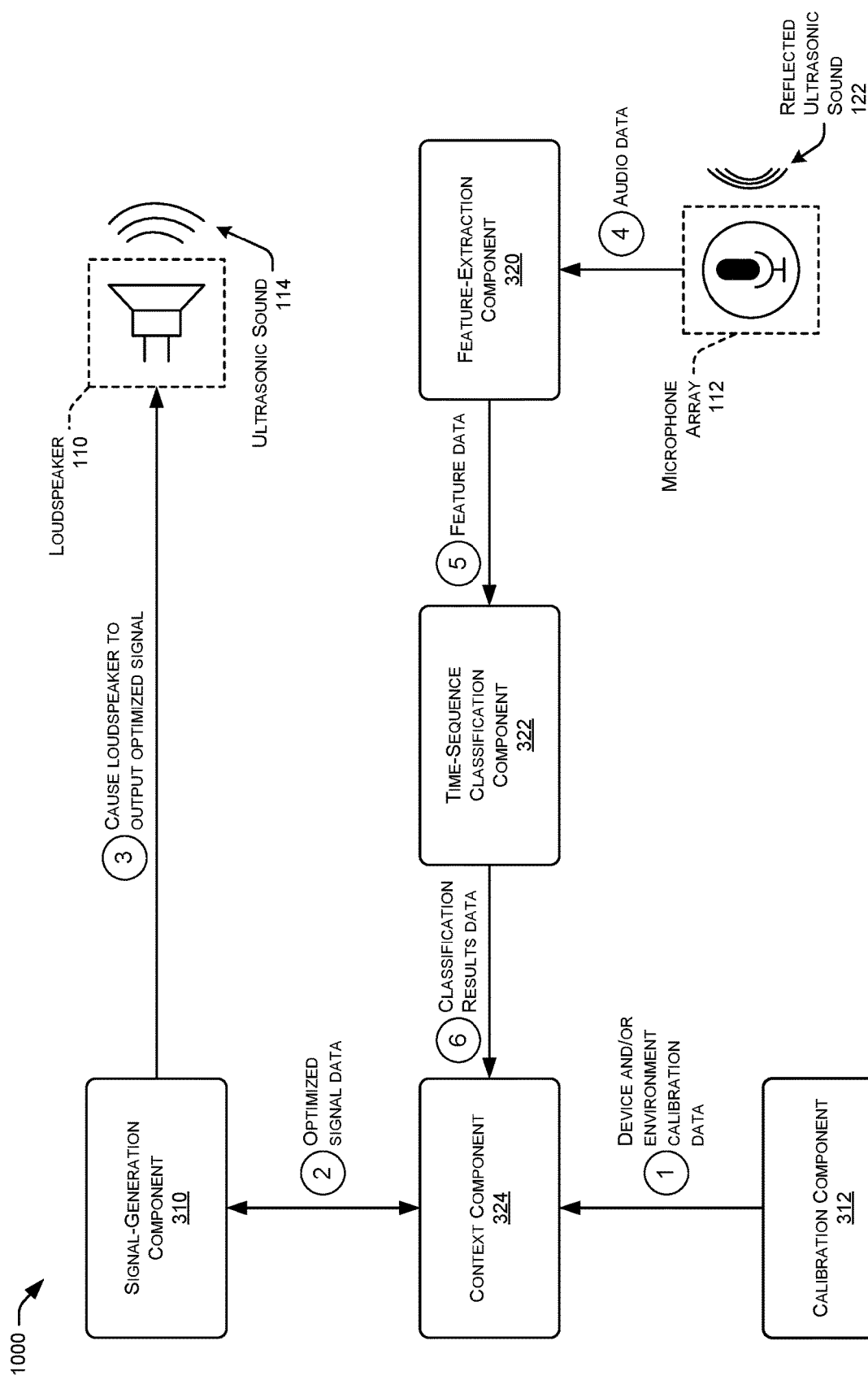
FIG. 10 illustrates an example high-level process for generating and emitting an ultrasonic signal into an environment, and analyzing audio data representing reflections of the ultrasonic signal off objects in the environment to detect presence or a user.

FIG. 10 illustrates an example high-level process 1000 for generating and emitting an ultrasonic signal into an environment, and analyzing audio data representing reflections of the ultrasonic signal off objects in the environment to detect presence or a user.

As illustrated, the calibration component 312 may initially determine device and/or environment calibration data. In some examples, the calibration component 312 may cause the signal-generation component 310 to generate audio data representing a calibration tone, such as an ultrasonic sweep signal, to determine audio characteristics of the environment of the presence-detection device 104. The calibration component 312 may perform device calibration to determine an optimal frequency range for ultrasonic signals to be emitted by the loudspeaker(s) 110 into the environment. For instance, the calibration component 312 may analyze various frequency ranges included in the sweep frequency range of the ultrasonic sweep signal and determine signal-to-noise (SNR) values for one or more frequency ranges. The calibration component 312 may determine which sub-frequency range in the sweep frequency range of the ultrasonic sweep signal has the best SNR value. Further, the calibration component 312 may generate, at least periodically, background noise audio data that represents background noise in the environment that may interfere with analysis of audio data that represents the ultrasonic signal. In this way, means subtraction may be performed to remove the unwanted background noise from the audio data representing the ultrasonic signal.

The context component 324 at "2" may provide the signal-generation component 310 with an indication of optimized signal data. For example, the context component 324 may determine, based at least partly on the SNR values for frequency ranges of audio data representing the ultrasonic sweep signal, a frequency and/or frequency range with a high, or the highest, SNR value for the environment. Additionally, the optimized signal data may indicate an optimized power at which to emit the ultrasonic signal. For example, the calibration component 312 may determine a size of the room using the sweep signal. The context component 324 may then determine a power that is appropriate for the room. Larger rooms may require an ultrasonic signal that is powered at a higher power than smaller rooms. Further, the optimized signal data may indicate whether the ultrasonic signal should be emitted continuously, periodically, pulsed, etc.

The signal-generation component 310 may, at "3", cause the loudspeaker(s) 110 to output an ultrasonic signal (e.g., emitted sound 114) that is optimized according to the optimized signal data received from the context component 324 at "2."

At least two microphones of the microphone(s) 112 may, at "4," generate and provide audio data to the feature-extraction component 320. The feature-extraction component 320 may perform various processing techniques on the multi-channel audio data streams and provide feature data at "5" to the time-sequence class cation component 322.

The time-sequence class cation component 322 may analyze the feature data (e.g., magnitude feature data 316, phase feature data 318, etc.), such as by using the ML model(s) 332, determine classification results data, and provide the classification results data at "6" to the context component 324. In some examples, the time-classification results data may indicate confidence scores associated with one or more of (i) detecting movement of an object, (ii) detecting a direction of the movement, and (iii) detecting one or multiple objects moving in the environment of the presence-detection device 104.

Figure 11:
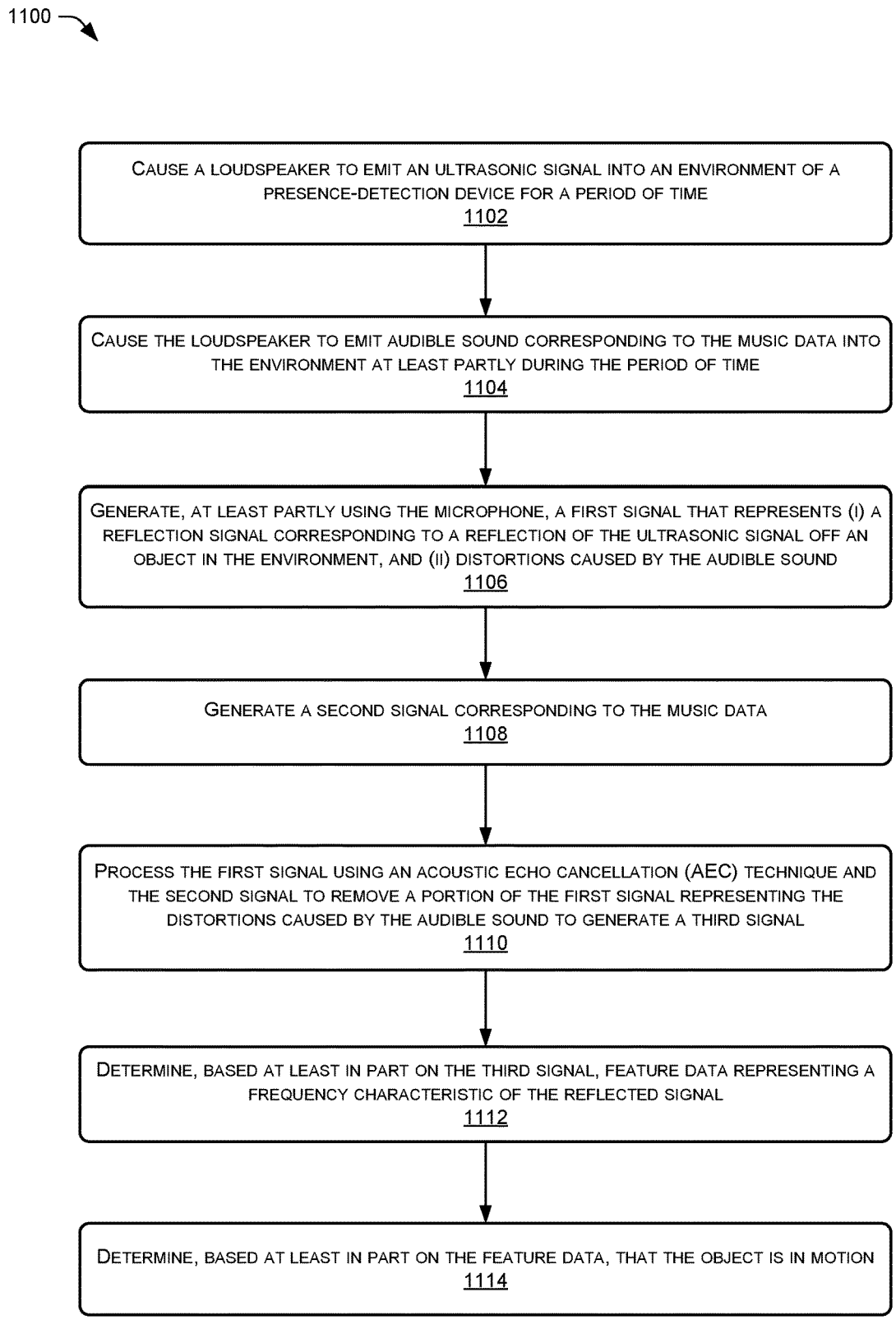
FIG. 11 illustrates a flow diagram of an example process for using an AEC technique to remove a portion of an analog signal that represents audible sound in order to isolate a portion of the analog signal representing a reflection of an ultrasonic signal to detect movement of a user in an environment.
Figure 12:
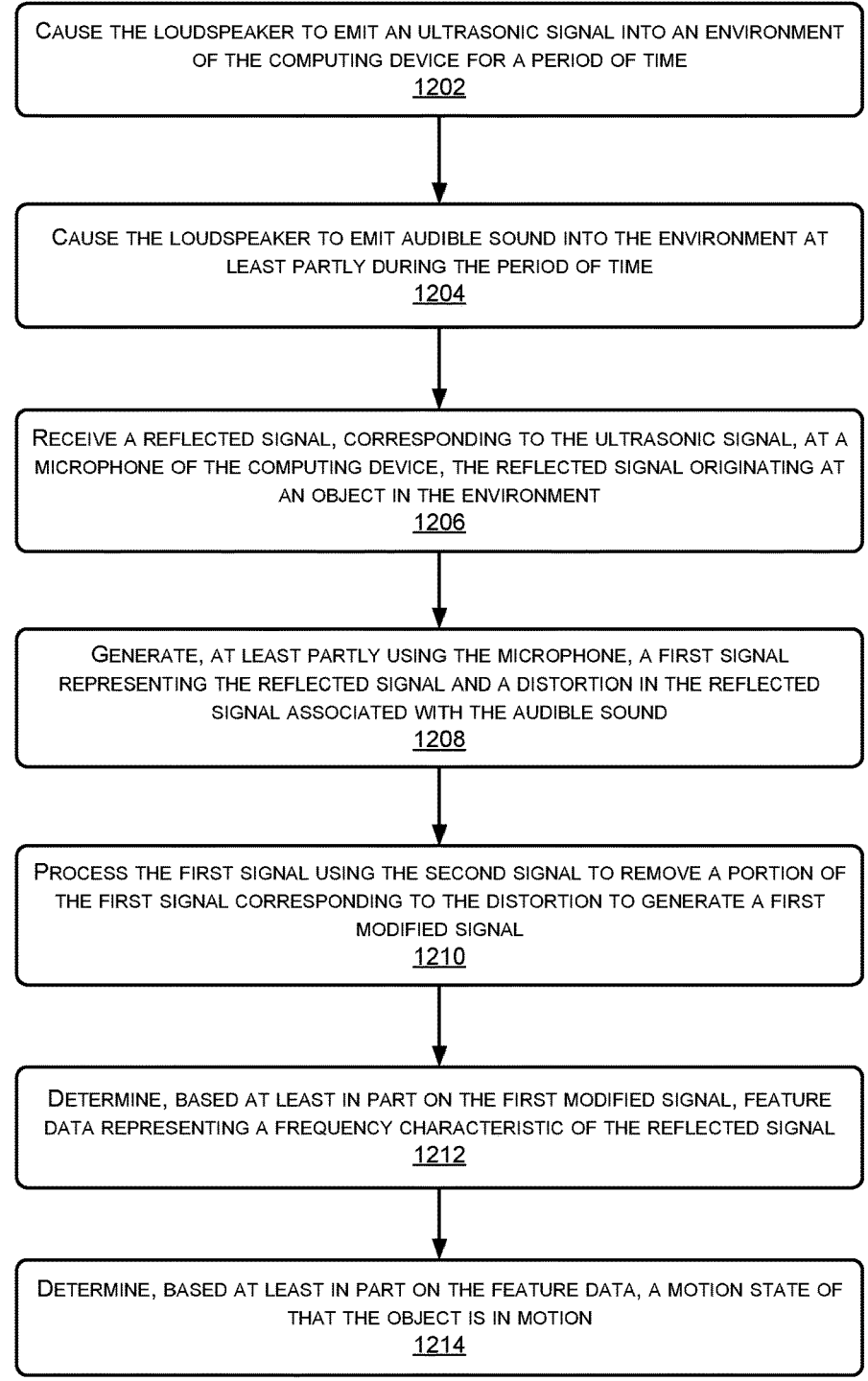
FIG. 12 illustrates a flow diagram of an example process for using an AEC technique to remove a portion of an analog signal that represents audible sound in order to isolate a portion of the analog signal representing a reflection of an ultrasonic signal to detect movement of a user in an environment.

FIGS. 11 and 12 illustrate flow diagrams of example processes/methods 1100 and 1200. These processes (as well as each process or method described herein,) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 11 illustrates a flow diagram of an example process 1100 for using an AEC technique to remove a portion of an analog signal that represents audible sound in order to isolate a portion of the analog signal representing a reflection of an ultrasonic signal to detect movement of a user in an environment.

At 1102, the presence-detection device 104 may cause the loudspeaker to emit an ultrasonic signal into an environment of the presence-detection device for a period of time. For example, the signal-generation component 310 may cause the loudspeaker 110 to emit a continuous ultrasonic signal over a period of time, or a pulsed ultrasonic signal over a period of time.

At 1104, the presence-detection device 104 may cause the loudspeaker to emit audible sound corresponding to the music data into the environment at least partly during the period of time. For instance, the loudspeaker 110 may output audible sound based on music data stored in the audio-data buffer 330.

At 1106, the presence-detection device 104 may generate, at least partly using the microphone 206, a first signal that represents (i) a reflection signal corresponding to a reflection of the ultrasonic signal off an object in the environment, and (ii) distortions the caused by the audible sound. For instance, the microphone 206 may generate or receive the audio signal 214 that represents the reflected signal 216 and distortions in the reflected signal 216 caused by the audible sound 116.

At 1108, the presence-detection device 104 may generate a second signal corresponding to the music data. In some instances, the second signal may be generated using the audio data in the audio-buffer 330, and in some examples, the second signal may be generated using a second microphone 206(2) in close proximity to the loudspeaker 110.

At 1110, the presence-detection device 104 may process the first signal using an acoustic echo cancellation (AEC) technique and the second signal to remove a portion of the first signal representing the sound to generate a third signal. For instance, the presence-detection device 104 may use the second signal representing the sound to remove the portion of the first signal that represents distortions in the reflected signal caused by the concurrent output of the audible sound to generate a third signal that represents the reflection signal.

At 1112, the presence-detection device 104 may determine, based at least in part on the third signal, feature data representing a frequency characteristic of the reflected signal. For example, the signal-processing component 314 may perform various operations on an audio signal from the AEC component 226 to determine the magnitude feature data 316 and the phase feature data 318. In various examples, determining the feature data at 810 and 812 may include decomposing the audio data into magnitude data and phase data corresponding to a frequency of the reflected signal, and applying a logarithmic transform algorithm to the magnitude data.

At 1114, the presence-detection device 104 may determine, based at least in part on the feature data, that the object is in motion. For instance, the time-sequence classification component 322 and/or the context component 324 may utilize an ML model(s) 332 to determine that the magnitude feature data 316 represents a frequency that is different (such as increased or decreased) than a frequency at which the ultrasonic signal was emitted. Additionally, the ML model(s) 332 may be trained to determine that the shift in the frequency spectrum represents a Doppler shift based on movement of the object.

FIG. 12 illustrates a flow diagram of an example process 1200 for using an AEC technique to remove a portion of an analog signal that represents audible sound in order to isolate a portion of the analog signal representing a reflection of an ultrasonic signal to detect movement of a user in an environment.

At 1202, the presence-detection device 104 may cause a loudspeaker of a computing device to emit an ultrasonic signal into an environment of the computing device for a period of time. For example, the signal-generation component 310 may cause the loudspeaker 110 to emit a continuous ultrasonic signal over a period of time, or a pulsed ultrasonic signal over a period of time.

At 1204, the presence-detection device 104 may cause the loudspeaker to emit audible sound into the environment at least partly during the period of time. For instance, the loudspeaker 110 may output sound based on music data stored in the audio-data buffer 330.

At 1206, the presence-detection device 104 may receive a reflected signal, corresponding to the ultrasonic signal, at a microphone of the computing device, the reflected signal originating at an object in the environment. At 1208, the presence-detection device 104 may generate, at least partly using the microphone, a first signal representing the reflected signal in a first frequency range. Further, the first signal may further represent a distortion in the reflected signal associated with (and/or caused by) the audible sound. That is, the distortion caused by the audible sound may be represented in the frequency range of the reflected ultrasonic signal.

At 1210, the presence-detection device 104 may process the first signal to remove a portion of the first signal corresponding to the distortion to generate a first modified signal. For instance, the presence-detection device 104 may use a second signal representing the audible sound (in the first frequency range) to remove the portion of the first signal that represents the distortions in the reflection signal caused by concurrent output of the audible sound to generate a first modified signal that represents the reflection signal (and potentially distortions caused by the Doppler effect).

At 1212, the presence-detection device 104 may determine, based at least in part on the one or more signals, feature data representing a frequency characteristic of the reflected signal. For example, the signal-processing component 314 may perform various operations on an audio signal from the AEC component 226 to determine the magnitude feature data 316 and the phase feature data 318. In various examples, determining the feature data at 810 and 812 may include decomposing the audio data into magnitude data and phase data corresponding to a frequency of the reflected signal, and applying a logarithmic transform algorithm to the magnitude data.

At 1214, the presence-detection device 104 may determine, based at least in part on the feature data, a motion state of the object. For instance, the time-sequence classification component 322 and/or the context component 324 may utilize an ML model(s) 332 to determine that the magnitude feature data 316 represents a frequency that is different (such as increased or decreased) than a frequency at which the ultrasonic signal was emitted. Additionally, the ML model(s) 332 may be trained to determine that the shift in the frequency spectrum represents a Doppler shift based on movement of the object. Thus, the ML model(s) 332 may determine motion state of the object is that the object is in motion. In another example, the ML model(s) 332 may determine there is no Doppler effect and determine that the motion state of the object is not in motion. In some instances, the motion state may be a confidence value indicating a likelihood that the object is in motion based on distortions in the reflected signal.

In some instance, the first modified signal is in a frequency range having a center frequency, and the method 1200 further includes identifying a first group of the feature data that represents a first portion of the first modified signal above the center frequency and identifying a second group of the feature data that represents a second portion of the first modified signal below the center frequency. Further, the method 1200 may additionally include determining, at least partly using a machine-learning (ML) model, that a first portion of the first group and a second portion of the second group are correlated by less than a threshold correlation value. That is, the ML model may determine that first and second portion are not symmetric, or not correlated, with respect to a threshold correlation value that indicates symmetry or correlation. Additionally, the ML model may output a confidence value indicating a likelihood that the object is in motion, based at least in part on the first portion being correlated with the second portion by less than the threshold correlation value. That is, because the first portion and second portion are not correlated, the first portion and second portion may represent a distortion caused by the Doppler effect.

As used herein, a processor, such as processor(s) 302 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 302 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 302 may possess its own local memory, which also may store program components, program data, and/or one or more operating systems.

As described herein, computer-readable media and/or memory 304 may include volatile and nonvolatile memory, removable and non-removable media implemented in any method or technology for storage of information, such as computer-readable instructions, data structures, program component, or other data. Such computer-readable media and/or memory 304 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 302 to execute instructions stored on the computer-readable media and/or memory 304. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 304, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 338 may enable communications between the presence-detection device 104 and other networked devices. Such network interface(s) 338 can include one or more network interface controllers (NICs) or other types of transceiver devices to send and receive communications over a network.

For instance, the network interface(s) 338 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 338 may include a wide area network (WAN) component to enable communication over a wide area network. The networks that the presence-detection device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A presence-detection device comprising:
   a microphone;
   a loudspeaker;
   an audio buffer storing music data;
   one or more processors; and
   one or more computer-readable media storing computer-executable instructions that, when executed by the one or more processors, cause the one or more processors to perform operations comprising:
      causing the loudspeaker to emit an ultrasonic signal into an environment of the presence-detection device for a period of time;
      causing the loudspeaker to emit audible sound corresponding to the music data into the environment at least partly during the period of time;
      receiving, using the microphone, a first signal that represents, in a first frequency range, (i) a reflection signal corresponding to a reflection of the ultrasonic signal off an object in the environment, and (ii) distortions caused by the audible sound;
      generating a second signal corresponding to the music data;
      processing the first signal using an acoustic echo cancellation (AEC) technique and the second signal to remove a portion of the first signal representing the distortions caused by the audible sound to generate a third signal;
      determining, based at least in part on the third signal, feature data representing a frequency characteristic of the reflected signal; and
      determining, based at least in part on the feature data, that the object is in motion.

2. The presence-detection device of claim 1, wherein the microphone is a first microphone, further comprising:
   a second microphone disposed in closer proximity to the loudspeaker than the first microphone,
   wherein the second signal corresponding to the music data is generated using the second microphone.

3. The presence-detection device of claim 1, prior to processing the first signal, the operations further comprising:
demodulating the first signal from the first frequency range to a second frequency range associated with a baseband frequency; and
downsampling the first signal at a rate of about 2 kHz;
wherein the second signal is generated at a third frequency range associated with the baseband frequency.

4. A method comprising:
causing a loudspeaker of a computing device to emit an ultrasonic signal into an environment of the computing device for a period of time;
causing the loudspeaker to emit audible sound into the environment at least partly during the period of time;
receiving a reflected signal, corresponding to the ultrasonic signal, at a microphone of the computing device, the reflected signal originating at an object in the environment;
generating, at least partly using the microphone, a first signal representing, in a first frequency range, the reflected signal and a distortion in the reflected signal associated with the audible sound;
generating a second signal corresponding to the audible sound;
processing the first signal using the second signal to remove a portion of the first signal corresponding to the distortion to generate a first modified signal;
determining, based at least in part on the first modified signal, feature data representing a frequency characteristic of the reflected signal; and
determining, based at least in part on the feature data, a motion state of the object.

5. The method of claim 4, wherein:
the microphone is a first microphone;
generating the second signal includes receiving, at a second microphone of the computing device, a representation of the audible sound; and
the second microphone is located in closer to the loudspeaker than the first microphone.

6. The method of claim 4, further comprising, prior to processing the first signal:
demodulating the first signal from the first frequency range to a second frequency range associated with a baseband frequency,
wherein:
the second signal is in a third frequency range associated with the baseband frequency; and
processing the first signal includes inputting the first signal and the second signal into an acoustic echo cancellation (AEC) component.

7. The method of claim 4, wherein the second signal is generated at a sample rate using audio data representing the sound, the method further comprising:
downsampling the first signal at the sample rate to generate a second modified signal;
wherein processing the first signal includes inputting the second modified signal and the second signal into an acoustic echo cancellation (AEC) component.

8. The method of claim 4, wherein the first modified signal is in a frequency range having a center frequency, the further comprising:
identifying a first group of the feature data that represents a first portion of the first modified signal above the center frequency;
identifying a second group of the feature data that represents a second portion of the first modified signal below the center frequency;
determining, at least partly using a machine-learning (ML) model, that a first portion of the first group and a second portion of the second group are correlated by less than a threshold correlation value; and
outputting, at least partly using the ML model, a confidence value indicating a likelihood that the object is in motion, based at least in part on the first portion being correlated with the second portion by less than the threshold correlation value.

9. The method of claim 8, further comprising:
determining a power level at which the sound is emitted into the environment; and
determining, based at least in part on the power level, a confidence value associated with indicating motion,
wherein determining that the object is in motion is based at least in part on the confidence value being within a confidence value range indicating motion.

10. The method of claim 4, further comprising:
determining a first power level at which the sound is emitted into the environment;
determining a second power level at which the ultrasonic signal is emitted, wherein a total of the first power level and the second power level is less than a threshold power level associated with audio clipping by the loudspeaker;
mixing first audio data representing the ultrasonic signal with second audio data representing the sound to generate third audio data; and
causing the loudspeaker to, at least partly using the third audio data, emit the sound at the first power level and the ultrasonic signal at the second power level.

11. The method of claim 4, wherein:
the ultrasonic signal is emitted at a first frequency that has a value between 20 kilo-hertz (kHz) and 96 kHz; and
the audible sound is emitted at a second frequency that has a value between 20 Hz and 20 kHz.

12. A computing device comprising:
a loudspeaker;
a microphone;
one or more processors; and
one or more computer-readable media storing computer-executable instructions that, when executed by the one or more processors, cause the one or more processors to perform operations comprising:
causing the loudspeaker to emit an ultrasonic signal into an environment of the computing device for a period of time;
causing the loudspeaker to emit audible sound into the environment at least partly during the period of time;
receiving a reflected signal, corresponding to the ultrasonic signal, at a microphone of the computing device, the reflected signal originating at an object in the environment;
generating, at least partly using the microphone, one or more signals representing, in a first frequency range, the reflected signal and a distortion associated with the audible sound;
processing the one or more signals to remove a portion of the one or more signals corresponding to the distortion to generate a first modified signal;
determining, based at least in part on the first modified signal, feature data representing a frequency characteristic of the reflected signal; and
determining, based at least in part on the feature data, a motion state of the object.

13. The computing device of claim 12, wherein:
the microphone is a first microphone and further comprising a second microphone;
the second microphone being located in closer proximity to the loudspeaker than the first microphone;
generating the one or more signals includes:
  generating, using the first microphone, a first signal representing the reflected signal and the distortion; and
  generating, using the second microphone, a second signal representing the audible sound;
processing the one or more signals includes inputting the first signal and the second signal into an acoustic echo cancellation (AEC) component to remove the portion of the first signal representing the distortion to generate the first modified signal; and
determining the feature data includes extracting the feature data from the first modified signal.

14. The computing device of claim 12, wherein generating the one or more signals includes:
  generating, using the microphone, a first signal representing the reflected signal and the distortion; and
  generating a second signal using audio data corresponding to the audible sound, the second signal being in a second frequency range associated with a baseband frequency;
the operations further comprising:
  demodulating the first signal from the first frequency range to the second frequency range associated with the baseband frequency,
  wherein processing one or more signals includes inputting the first signal and the second signal into an acoustic echo cancellation (AEC) component.

15. The computing device of claim 12, wherein generating the one or more signals includes:
  generating, using the microphone, a first signal representing the reflected signal and the distortion; and
  generating a second signal at a sample rate using audio data corresponding to the audible sound;
the operations further comprising:
  downsampling the first signal at the sample rate to generate a third signal;
  wherein processing the one or more signals includes inputting the third signal and the second signal into an acoustic echo cancellation (AEC) component.

16. The computing device of claim 12, wherein the ultrasonic signal is a first ultrasonic signal emitted in the first frequency range, the operations further comprising:
  causing the loudspeaker to emit a second ultrasonic signal emitted in a second frequency range during the period of time;
  wherein processing the one or more signals includes
    determining that a first portion of the one or more signals in the first frequency range is correlated to a second portion of the one or more signals in the second frequency range;
    determining that the first portion and the second portion each represent the audible sound based at least in part on the first portion and second portion being correlated; and
    removing the first portion and the second portion from the one or more signals.

17. The computing device of claim 12, wherein first modified signal has a center frequency, the operations further comprising:
  identifying a first group of the feature data that represents a first portion of the one or more signals above the center frequency;
  identifying a second group of the feature data that represents a second portion of the one or more signals below the center frequency;
  determining, at least partly using a machine-learning (ML) model, that a first portion of the first group and a second portion of the second group are correlated by less than a threshold correlation value; and
  outputting, at least partly using the ML model, a confidence value indicating a likelihood that the object is in motion based at least in part on the first portion being correlated with the second portion by less than the threshold correlation value.

18. The computing device of claim 17, the operations further comprising:
  determining a power level at which the audible sound is emitted into the environment by the loudspeaker;
  determining, based at least in part on the power level, a confidence value associated with indicating motion,
  wherein determining that the object is in motion is based at least in part on the confidence value being within a confidence value range indicating motion.

19. The computing device of claim 12, the operations further comprising:
  determining a first power level at which the audible sound is emitted;
  determining a second power level at which the ultrasonic signal is emitted, wherein a total of the first power level and the second power level is less than a threshold power level associated with audio clipping by the loudspeaker;
  mixing first audio data representing the ultrasonic signal with second audio data representing the audible sound to generate third audio data; and
  causing the loudspeaker to, at least partly using the third audio data, emit the audible sound at the first power level and the ultrasonic signal at the second power level.

20. The computing device of claim 12, wherein:
the ultrasonic signal is emitted at a first frequency that has a value between 20 kilo-hertz (kHz) and 96 kHz; and
the audible sound is emitted at a second frequency that has a value between 20 Hz and 20 kHz.

* * * * *